United States Patent [19]

Duncan et al.

[11] Patent Number: 4,732,741

[45] Date of Patent: Mar. 22, 1988

[54] METHOD OF MAKING BETA″-ALUMINA

[75] Inventors: James H. Duncan, Stafford; Peter Barrow, Alvaston, both of United Kingdom; Arnold Van Zyl; Angus I. Kingon, both of Pretoria, South Africa

[73] Assignee: Lilliwyte Societe Anonyme, Rue Des Girondins, Luxembourg

[21] Appl. No.: 866,057

[22] Filed: May 21, 1986

[30] Foreign Application Priority Data

May 24, 1985 [GB] United Kingdom ............ 8513196
Oct. 16, 1985 [GB] United Kingdom ............ 8525477

[51] Int. Cl.$^4$ ............................................ C01F 7/06
[52] U.S. Cl. .................................. 423/119; 423/600; 423/625; 423/627; 429/193
[58] Field of Search ............ 423/600, 625, 627, 119; 429/193

[56] References Cited

U.S. PATENT DOCUMENTS

| | | | |
|---|---|---|---|
| 3,795,723 | 3/1974 | Clendenan et al. | 264/65 |
| 4,013,477 | 3/1977 | Jatkar et al. | 429/193 |
| 4,024,214 | 5/1977 | Foster et al. | 423/600 |
| 4,113,928 | 9/1978 | Virkar et al. | 429/193 |
| 4,138,455 | 2/1979 | Shaikh et al. | 429/193 |
| 4,339,511 | 7/1982 | Morgan | 429/193 |

FOREIGN PATENT DOCUMENTS 1386244 3/1975 United Kingdom .

OTHER PUBLICATIONS

Ray et al., "Synthesis of Sodium β and β″alumina", Mat-Res. Bull. vol. 10, No. 6, pp. 583–590, (1975).
Oxides and Hydroxides of Aluminum, Technical Paper No. 19, by Karl Wefers and Gordon M. Bell, Alcoa Research Laboratories, 1972.
Two-Step Continuous Sintering Schedules for Beta-Al$_2$O$_3$ Ceramics by Kvanchkov et al.
Conversion Catalysis and Microstructure Control in the Sintering of Lithia-Stabilized Beta-Alumina by Jatkar, et al.
Pre-Pilot and Pilot Plant Development of Beta-Alumina Electrolytes and Rutile-Container Current Collectors for the Sodium Sulphur Battery, by R. S. Gordon on behalf of the University of Utah, Utah Research Institute and Ceramatic, Inc. to the Ford Motor Company for the U.S. Department of Energy, Jan. 1979.

*Primary Examiner*—Patrick P. Garvin, Sr.
*Assistant Examiner*—Paige C. Harvey
*Attorney, Agent, or Firm*—Arnold, White & Durkee

[57] ABSTRACT

A method of making beta″-alumina comprises dispersing in a precursor of aluminum oxide a member of the group comprising sodium oxide and its precursors, and dispersing in the precursor of aluminum oxide a spinel stabilizer which is a member of the group comprising spinel-forming oxides and the precursors thereof, to form a mixture. The mixture is then heated to a temperature at which at least some of the precursor of aluminum oxide is converted to beta″-alumina. The precursor of aluminum oxide is one which, when calcined in air by itself, has a calcination product which, when subjected to X-ray diffraction, displays a predetermined X-ray diffraction trace. The X-ray diffraction trace is one whose peak with the highest intensity in the 2 (theta) range of 44°–48° and whose peak with the highest intensity in the 2 (theta) range of 63°–69° respectively have maximum intensities and integrated intensities which comply with equations (I) and (II):

A/S is greater than 0.03     (I);

and

B/S is greater than 0.04     (II).

34 Claims, 6 Drawing Figures

FIG 2 LOG-LINEAR PLOT OF PARTICLE SIZE DISTRIBUTION

METHOD OF MAKING BETA"-ALUMINA

This invention relates to a method of making beta"-alumina. More particularly it relates to a method of making beta"-alumina suitable for making polycrystalline beta"-alumina artifacts, and to products produced by the method.

Beta-alumina is a sodium aluminate with the idealized chemical formula $Na_2O.11Al_2O_3$ having a layer structure where the sodium atoms are present in discrete layers separated by layers of aluminum atoms and oxygen ions, forming a spinel-type structure. Beta"-alumina with the approximate chemical formula $Na_2O.5Al_2O_3$ has a similar structure but is a lower resistivity material of particular interest as an ionic conductor in electrochemical cells.

According to the invention there is provided a method of making beta"-alumina which comprises dispersing in a precursor of aluminium oxide a member of the group comprising sodium oxide and its precursors, and dispersing in the precursor of aluminium oxide a spinel stabilizer which is a member of the group comprising spinel-forming oxides and the precursors thereof, to form a mixture, and then heating the mixture to a temperature at which at least some of the precursor of aluminium oxide is converted to beta"-alumina, the precursor of aluminium oxide being one which, when calcined in air by itself, has a calcination product which, when subjected to X-ray diffraction as defined herein, displays an X-ray diffraction trace whose peak with the highest intensity in the 2(theta) range of 44°–48° and whose peak with the highest intensity in the 2(theta) range of 63°–69° respectively have maximum intensities and integrated intensities which comply with equations (I) and (II):

$$A/S \text{ is greater than } 0.03 \quad (I);$$

and $$B/S \text{ is greater than } 0.04 \quad (II),$$

in which:

$$A = \frac{(\text{maximum intensity})^2}{(\text{integrated intensity})}$$

in counts per second/2(theta)° for the calcination product in the 2(theta) range 44°–48°;

$$B = \frac{(\text{maximum intensity})^2}{(\text{integrated intensity})}$$

in counts per second/2(theta)° for the calcination product in the 2(theta) range 63°–69°;

$$S = \frac{(\text{maximum intensity})^2}{(\text{integrated intensity})}$$

in counts per second/2(theta)° for the 211 peak in a rutile ($TiO_2$) standard occuring in the 2(theta) range 52°–56°;

maximum intensity=the maximum intensity in counts per second above background displayed by the peak with the highest intensity in the 2(theta) range in question; and integrated intensity=the area under the peak, above background in the 2(theta) range in question, in units of 2(theta)°×counts per second, A, B and S being mean values for at least five samples having a standard deviation of less than 10% and the rutile standard being the intensity standard rutile of the National Bureau of Standards of the United States Department of Commerce accorded standard material No. 674 and having a d-spacing of 1.6874 Angstrom units for the 211 peak in question.

In other words, the maximum intensity is the maximum height (in counts per second) above background of said peak with the highest intensity in the 2(theta)° range in question; and the integrated intensity (in 2(theta)°×counts per second) can be represented by the area above background of said peak with the highest intensity in the 2(theta) range in question, whose units will be counts per second×2(theta)°. A, B and S thus represent counts per second/2(theta)° and the numerical values given by equations (I) and (II) represent dimensionless values for A and B, normalized by division thereof by the value of S to take into account any possible variations introduced by instrument and sample preparation variables.

The term precursor as used herein with regard to sodium oxide and the spinel-forming oxides lithia and magnesia, means a compound of sodium, lithium or magnesium, as the case may be, with one or more non-metals, which compound, when calcined in air, decomposes to form sodium oxide (soda), lithium oxide (lithia) or magnesium oxide (magnesia), as the case may be. Naturally, the term precursor as defined above with regard to alumina, correspondingly means a compound of aluminium with one or more non-metals, which decomposes when calcined in air to form aluminium oxide.

X-ray diffraction as defined herein means the sample preparation and testing procedure set out hereunder to obtain the X-ray diffraction traces in question for said calcination product and rutile standard.

First, the precursor of aluminium oxide which forms the starting material from which, together with the aforesaid sodium oxide and spinel stabilizer, beta"-alumina is made according to the method of the present invention, must be calcined in air by itself. This is by heating a suitable mass thereof, eg about 10 g, in air in an alpha-alumina or other suitably inert crucible from ambient temperature up to 700° C. (the calcination temperature) according to the following heating regime:

ambient up to 600° C.—heat at 200° C./hr.

600° C. up to 700° C.—heat at 100° C./hr.

700° C.—hold for 2 hrs.

The calcined material is then cooled at 200° C./hr from 700° C. down to ambient. Ambient temperature should be set at 20° C. The above heating regime can naturally be varied somewhat within limits without materially affecting test results but it is preferable to adhere to it as closely as possible.

The calcined sample material is then milled into a fine powder so that at least the major proportion thereof by mass will pass a screen of 200 ASTM mesh. The Applicant has found that this can conveniently be done by milling the sample in a laboratory agate centrifugal ball mill for about 30 minutes. A suitable mill is a Type S1 centrifugal ball mill (220 V, 50 Hz) available from Retsch GmbH, Dusseldorf, Germany, operated at its maximum speed of 450 rpm.

The milled calcined sample then has an inert organic binder admixed therein, the mass of binder amounting to 2.5% by mass of the calcined material and the binder being added before a final short milling period, eg 2 minutes in said centrifugal ball mill, to mix in the binder. The binder should be inert in that it displays no X-ray diffraction peaks in the 2(theta) ranges specified above, and should not add significantly (more than 50%) to background X-ray count levels. The Applicant has found that high purity instant coffee powders dried for 2 hrs at 120° C. meet these requirements for binders. Once again, the above milling procedure and the amount of binder used can naturally be varied within limits without materially affecting test results but it is again preferable to adhere thereto as closely as possible.

Sufficient samples should then be prepared for testing in the X-ray diffractometer to be used, sufficient (eg 5-10) for a sufficiently low standard deviation of less than 10% to be obtained. An equal number of the rutile standard samples should be prepared directly from the standard material and without any calcining, milling or binder. The samples should have a sufficient area to accommodate the X-ray beam of the diffractometer without any X-ray diffraction off the edges of the sample and should be sufficiently thick to maintain its physical integrity during testing. In the testing procedure described hereunder, a planar sample holder having a flat surface and an opening therethrough is employed, the sample material being compacted into the opening and having a testing surface coplanar with said flat surface. The sample holder is placed with its flat surface against an unpolished flat stainless steel support surface, the sample (or rutile standard as the case may be) material is introduced into the opening and is compacted therein by a plunger or piston with a force equivalent to a pressure of 25 MPa on the sample material. This pressure is selected as far as possible to be insufficient to cause any particle flow during compaction and to prevent as far as possible particles of the material from assuming any non-random orientation at the testing surface of the sample in contact with the steel support surface, which testing surface should as far as possible be free of any voids or cavities. To promote maintenance of said random particle orientation, the steel support surface should be ground by means of a silicon carbide abrasive grinding paper having a grit size between 80 and 200 grit, preferably between 180 and 200 grit. The Applicant has found that with a circular sample in an opening of 20-30 mm diameter in the sample holder, a sample thickness after compaction of at least 1 mm is sufficient for the sample to be self-supporting and to maintain its integrity during testing. Once again, some variation in sample preparation is possible, without materially affecting results, provided that the sample has a flat surface for testing which has sample particles sufficiently randomly oriented therein and is substantially free of voids and cavities, but the described procedure should preferably be followed as closely as possible.

In the diffractometer, a beam of $CuK_{alpha}$ X-rays having a wavelength of 1.5406 Angstrom units must be used, generated at 40 kV and 25 mA. These X-rays should be directed through a suitable pre-sample collimator at the sample whose surface should be located at the goniometer axis. A collimator having Soller slits has been found to be suitable, the receiving assembly having a divergence slit of 1°; the collimator having a specimen-receiving slit of 0.15 mm; a specimen scatter slit of 1°; and a monochromator-receiving slit of 0.3 mm. A specimen focussing distance from the target to the sample of 185 mm has been found to be suitable, leading to a monochromator focussing distance of 51.2 mm.

There must be a curved post-sample monochromator, the monochromator being a curved graphite crystal with a radius of curvature of 102.4 mm utilizing the 0002 planes; and the scanning must be according to a step scan mode at 0.02° 2(theta) per step and with a scanning time of 2 seconds per step.

The theta-2(theta) linkage should be within 0.0005° of 2(theta); and the X-ray detector should be a scintillator. Smoothing conditions should be employed according to a running averages method using no high frequency emphasis-type smoothing, using 8-point high frequency attenuation-type smoothing, and using a 24 point differential peak search. Peak search conditions should be according to a minimum width (between points of inflection) of 0.1° 2(theta), and a maximum peak steepness or slope of 5.

In the actual testing, samples of the calcined material tested should preferably be alternated with samples of the rutile standard, without any delays with the same instrument settings at 20° C., to minimize the effects of machine and other testing variables. Samples of calcined material must be run in the 2(theta) ranges of 42°-50° and 62°-70° and samples of rutile standard must be run in the 2(theta) range of 52°-56°.

Except for the $CuK_{alpha}$ radiation used, the monochromator specified above, and the step scan mode specified, which are essential to the sample testing by means of the diffractomater, the testing procedure can again be varied within limits without materially affecting test results, but again this procedure should preferably be adhered to as closely as possible.

For the X-ray diffraction the Applicant typically employs a Rigaku XRD Power Diffractometer Model Geigerflex D/MAX III A, manufactured by Rigaku Corporation, Tokyo, Japan.

After samples have been run, X-ray diffraction traces will have been prepared or can be prepared, in which the X-rays diffracted by the various samples are plotted against 2(theta), at least in the 2(theta) ranges of 42°-50° and 62°-70° for the calcined samples and 52°-56° for the rutile reference. From these traces the maximum intensities and integrated intensities used in equations (I) and (II) above should be derived for each peak in question by placing the traces on a digitizing table and digitizing the maximum heights (maximum intensity) of the highest peak between the integration limits in question, and digitizing sufficient (eg at least 40) points (more or less equally spaced) on each trace between said integration limits. Maximum intensities are obtained directly in this fashion and integrated intensities are obtained by measuring or calculating (eg by means of a suitable area determination algorithm) the area of said peak, ie the area below the trace of the peak. The maximum intensity and integrated intensity in each case is the intensity above the background intensity, which background is provided by a straight base line joining the 2(theta) integration limits for each peak. In other words, the integration limits on the trace are where perpendiculars to the 2(theta) axis at said limits on the axis intersect the trace; the base line is a straight line joining these points of intersection to each other; the maximum intensity is the distance, along a perpendicular to the 2(theta) axis which intersects the highest point on the peak of the trace above the base line, between said highest point and the base line; and the integrated intensity is the area of the peak below the trace and above the base line, and between said integration limits.

Obtaining maximum intensity and integrated intensity is now described with reference to FIG. 1, which shows a plot of an X-ray diffraction trace of the type in question, ie a plot of intensity in counts per second against 2(theta).

Figure 1:
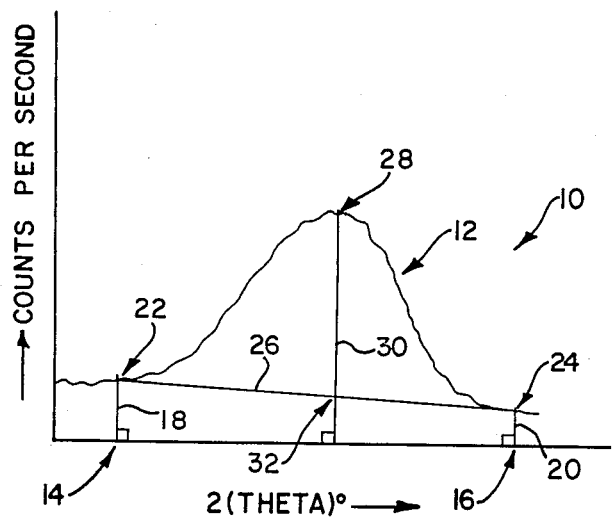
In FIG. 1 a plot is shown of a trace 10 which, as is typically the case, displays a single peak 12 between the integration limits. It is in principle possible for there to be more than one peak, in which case the peak with the highest intensity in counts per second (ie the highest peak) must be used for maximum intensity determination as described hereunder, any other (lower) peak between the integration limits being ignored.

The 2(theta) integration limits on the 2(theta) axis are shown in FIG. 1 at 14 and 16. Perpendiculars to the 2(theta) axis at 14 and 16 are shown respectively by lines 18 and 20. This perpendiculars 18 and 20 respectively intersect the trace 10 at 22 and 24, to provide the integration limits on the trace. A base line 26 is shown by a straight line joining the points 22 and 24, which base line represents background intensity. The highest point (maximum intensity) on the peak 12 is shown at 28. A line 30, intersecting the point 28 and perpendicular to the 2(theta) axis is shown intersecting the base line 26 at 32.

Maximum intensity of the peak 12 above background intensity is represented by the length of the line 30 (in counts per second) between the points 28 and 32. Integrated intensity is represented by the area of the peak 12, ie the area under the trace 10 and above the base line 26, between the integration limits 22 and 24 on the trace 10, ie the area enclosed by the points 22-28-24-32-22.

The Applicant has found that, when precursors of aluminium oxide as described above have values for A and B as defined above which comply with equations (I) and (II), heating mixtures of such precursors with sodium oxide and a suitable spinel stabilizer can lead to the production of a product containing high proportions of beta"-alumina.

Preferably, the precursor of aluminium oxide is such that said calcination product displays an X-ray diffraction trace whose peaks with the highest intensity in the 2(theta) ranges respectively of 44°-48° and 63°-69° have maximum intensities and integrated intensities which comply respectively with equations (III) and (IV):

A/S is greater than 0.05     (III);

and

B/S is greater than 0.05     (IV), wherein A, B and S are as defined above.

More preferably, the precursor of aluminium oxide is such that said calcination product displays an X-ray diffraction trace whose peaks with highest intensities in the 2(theta) ranges respectively of 44°-48° and 63°-69° have maximum intensities and integrated intensities which comply respectively with equations (V) and (VI):

A/S is greater than 0.09     (V);

and

B/S is greater than 0.07     (VI), wherein A, B and S are as defined above.

It follows thus that the higher said maximum intensities and/or the lower the integrated intensities, ie the higher and/or narrower the peaks in question, the better is regarded the precursor of aluminium oxide as a starting material for the method of the present invention. In other words A/S and B/S according to formulae (I) and (II) respectively should each be as high as possible for the calcined product of said precursor of aluminium oxide.

The Applicant has found that certain monohydrates of aluminium oxide, such as certain boehmites, and certain trihydrates of aluminium oxide, such as certain bayerites, form suitable precursors of aluminium oxide for use as starting materials for the method of the present invention. Surprisingly, others do not, and the Applicant has found that only those which, upon calcination, have values for A/S and B/S which are in accordance with formulae (I) and (II) respectively lead to satisfactory results in the production of a product containing a high proportion of beta"-alumina. Such useful hydrates of aluminium oxide need, in bulk, not be stoichiometrically pure, and the proportion of hydrated water can be somewhat variable, without necessarily affecting their utility.

Thus, the precursor of aluminium oxide may be hydrated, being a member of the group comprising monohydrates of alumina in accordance with the formula $Al_2O_3 \cdot mH_2O$ in which m is from 1 to 1.3 and trihydrates of alumina in accordance with the formula $Al_2O_3 \cdot nH_2O$ in which n is from 3 to 3.5.

The precursor of aluminium oxide may be a monohydrate of aluminium which is a boehmite, the boehmite having an average crystallite size as determined by X-ray line broadening and scanning electron microscopy of at least 100 Angstrom units, an average basal plane spacing as determined by X-ray diffraction of at most 6.8 Angstrom units, a mass loss on heating at 10° C./min from ambient temperature in air to 700° C. of at most 20% m/m, and, when heated at 10° C./min from ambient temperature in air up to 700° C., a maximum rate of mass loss occurring at a temperature of at least 400° C. Preferably said average crystallite size is at least 1,000 Angstrom units, said basal plane spacing is at most 6.5 Angstrom units, said mass loss on heating is at most 17%, and said maximum rate of mass loss occurs at a temperature of at least 500° C. The boehmite may be hydrothermally prepared. By "hydrothermally prepared" is meant that the boehmite (which can be represented by A100H or $Al_2O_3 \cdot H_2O$) was prepared by the hydrothermal conversion in water or a dilute alkaline aqueous solution at a temperature in the range 150°-300° C. from alumina trihydrate which in turn had been made by the Bayer process. The Bayer process is described eg in The Condensed Chemical Dictionary, 9th Edition, revised by Gessner G. Hawley, Van Norstrand Reinhold Co., 1977, page 94. This hydrothermal conversion of alumina trihydrate to boehmite is described by Hüttig et al in an article entitled "Information on the System $Al_2O_3 \cdot H_2O$"—Z. Anorg. Allg. Chem., 171, 232-243 (1928).

In particular the boehmite may be that available as Cera Hydrate, and Cera Hydrate boehmite is available from BA Chemicals Plc, Gerrards Cross, Buckinghamshire, Great Britain, Cera Hydrate is hydrothermally prepared, has a specific surface area of 5 m²/g (as determined by Brunauer, Emmett and Teller (BET) nitrogen adsorption), and has an average crystallite size as received of 50,000 Angstrom units as determined by scanning electron microscopy (and 8,000 Angstrom units after milling as described hereunder), and undergoes the major part of its dehydration, when its temperature is raised, at temperatures between 470°–550° C. In this regard it should be noted that boehmite having a theoretically pure crystal structure will have a basal plane spacing of about 6.11 Angstrom units, a mass loss on heating to 700° C. from ambient of about 15% by mass, and its maximum rate of mass loss (the point of inflection on its thermogravimetric analysis (TGA) curve) will be at about 540° C. when heated at 10° C./min.

Instead, the precursor of aluminium oxide may be a trihydrate of alumina and is a bayerite, the bayerite having an average crystallite size as determined by X-ray line broadening and scanning electron microscopy of at least 100 Angstrom units, an average basal plane spacing as determined by X-ray diffraction of at most 4.9 Angstrom units, a mass loss on heating at 10° C./min from ambient temperature in air to 700° C. of at most 40% by mass, and, when heated at 10° C./min from ambient temperature in air up to 700° C., a maximum rate of mass loss occurring at a temperature of at least 240° C. Said average crystallite size may be at least 500 Angstrom units, said basal plane spacing being at most 4.75 Angstrom units, said mass loss on heating being at most 37%, and said maximum rate of mass loss occuring at a temperature of at least 260° C. In this regard it should be noted that bayerite having a theoretically pure crystal structure will have a basal plane spacing of about 4.67 Angstrom units, a mass loss on heating to 700° C. from ambient at 10° C./hr of about 35% by mass, and its maximum rate of mass loss (the point of inflection on its TGA curve) will be at about 280° C. when heated at 10° C./min.

The Applicant has found that a suitable bayerite for use in accordance with the invention is Kaiser Bayerite available from Kaiser Aluminium and Chemical Corporation, Southwest Region, 12,600 Northborough Drive, Houston, Tex., United States of America.

In this regard (both for boehmite and bayerite at least) the Applicant has found that large crystallites in the precursor of aluminium oxide used as the starting material (corresponding to a low specific surface area) favour a higher proportion of beta"-alumina in the product, and average crystallite sizes of at least 1,000 Angstrom units, more preferably at least 8,000 Angstrom units or more, are thus desirable. These crystallite sizes correspond to specific surface areas of at most 10 m²/g, more preferably at most 5 m²/g, or less.

Similarly, the Applicant has found that precursors of aluminium oxide used as starting materials which are hydrates of aluminium oxide, eg boehmites or bayerites, are desirable and favour higher proportions of beta"-alumina in the product, if they, upon heating, dehydrate at relatively high temperatures. For example, for boehmite the maximum rate of dehydroxylation, ie the maximum rate of weight loss upon heating, should take place, as mentioned above, above 400° C. and preferably above 500° C. In other words, the major proportion of the dehydroxylation, ie 80% or more of the total potential dehydroxylation, should preferably take place at a high temperature, above say 470° C. (eg in the range of 470°–560°) when heated at 10° C./min from ambient up to 700° C. as mentioned above.

These factors, ie large crystallite sizes, low specific surface areas and high temperatures for dehydroxylation, are indicative of a well developed and well ordered crystal structure in the precursor of aluminium oxide used as the starting material. Without being bound by theory, the Applicant believes that this corresponds with high values for A/S and B/S for equations (I) and (II) above, and indicates that a well ordered and long range crystal structure in said starting material, whether it is a hydrate of aluminium oxide or another suitable precursor, is desirable. Preferably the precursor, apart from meeting the requirement of sufficiently high values for A/S and B/S, should thus also have large crystallites and a low specific surface area, and should undergo its greatest rate of mass loss and indeed lose the greatest proportion of this mass loss, at relatively high temperatures. Kaiser Bayerite and, particularly, Cera Hydrate, meet at least some of these criteria.

By boehmite is meant the orthorhombic form of aluminium oxide monohydrate, $Al_2O_3.H_2O$, whose crystal lattice structure has the symmetry which is defined by the space group $D_{2h}^{17}$; and by soda, lithia and magnesia are meant respectively $Na_2O$, $Li_2O$ and $MgO$, ie sodium oxide, lithium oxide and magnesium oxide, their precursors being compounds such as the salts thereof, eg the hydroxides or carbonates, which when heated in the presence of air yield said soda, lithia or magnesia, as the case may be. By bayerite is meant the monoclinic form of aluminium oxide trihydrate whose crystal lattice structure has the symmetry which is defined by the space group $C_{2h}^5$, as determined by R. Rothbauer, et al. Z. Kritallogr. 125, 317-331 (1967).

The mixture which is heated may be formulated to contain, after heating, 7–10% by mass soda, ie 7–10% by mass sodium oxide. Preferably when boehmite is the starting material/precursor of aluminium oxide, the mixture after heating contains 9% by mass soda.

By "spinel-forming oxide", examples of which are lithia and magnesia, is meant an oxide which, when dispersed in a beta-alumina-type material, above a transition temperature promotes the stability therein of any beta"-alumina phase so formed. Without the spinel-forming oxide the beta"-alumina typically converts to beta-alumina at temperatures above the transition temperature, so that an artifact consisting of beta"-alumina is difficult to fabricate as described herein. Such spinel-forming oxides accordingly act as spinel-stabilizers and are also referred to as such herein.

The method can thus be employed merely to form beta"-alumina, or it can be employed to form, at the same time, a polycrystalline beta"-alumina artifact, ie a unitary self-supporting mass, as described hereunder. In each case the bayerite, boehmite or like precursor of aluminium oxide which is heated will have dispersed therein a spinel-stablilizer/spinel-forming oxide, for stabilizing the spinel-type structure of the beta"-alumina, and, particularly, when an artifact is to be made, for resisting decomposition, of beta"-alumina to beta-alumina, during firing up to the temperature required to form a fully dense artifact.

The spinel-stabilizer/spinel-forming oxide may thus be a member of the group comprising lithia, magnesia, and the precursors thereof. The mixture which is heated may be formulated to contain, after heating, lithia as its spinel stabilizer, in a proportion of 0.05–1.0% by mass. Instead, the mixture which is heated may be formulated to contain, after heating, magnesia as its spinel stabilizer, in a proportion of 0.25–5% by mass.

When the precursor of aluminium oxide is boehmite and lithia is the spinel-stabilizer, the mixture which is heated will preferably be formulated to contain, after heating, 0.2–0.8% by mass lithia. Similarly, when magnesia is used as spinel-stabilizer with boehmite, the mixture which is heated will preferably be formulated to contain, after heating, from 2.5–4% by mass magnesia.

Instead of employing lithia or a precursor thereof, or magnesia or a precursor thereof, by itself, mixtures of lithia and magnesia or the precursors thereof can be used. In this regard, for alpha-alumina for example, 0.75% by mass lithia is equivalent to about 4% by mass magnesia as regards its utility in stabilizing the beta″-alumina phase, and when the aforesaid mixtures of lithia or its precursors with magnesia or its precursors are used, the relative proportions of lithia or its precursors on the one hand, and magnesia or its precursors on the other hand, should be selected accordingly.

The soda and spinel stabilizer may be dispersed in the precursor of aluminium oxide by milling. The milling may be wet milling until 80% by mass of the milled material is less than 55,000 Angstrom units in size, the milled material being spray-dried prior to heating. Preferably, said spinel-forming oxides such as lithia and/or magnesia or their precursors, and the sodium oxide or its precursor, should be as evenly homogeneously dispersed through the precursor of aluminium oxide as possible or practicable, and this is thus typically effected by milling the precursor of aluminium oxide to a fine particle size, the milling acting to cause the dispersion. Milling may be in the presence of water by way of a vibro-energy mill so that a proportion of the particles of the boehmite are less than 30 microns in size, and is preferably as mentioned above such that at least 80% by mass thereof are less than 5.5 microns (55,000 Angstrom units) in size, including any lithia, magnesia, soda or precursors thereof added to the boehmite. This can be achieved by milling for say 2–10 hours or more in said vibro-energy mill.

After milling, as mentioned above, the milled material may be spray dried. Instead, a gel can be formed by mixing the boehmite with water, peptizing the mixture, eg by acidifying it to a pH of about 4 using acetic acid, and milling it, the other constituents being mixed into the milled mixture in aqueous solution form followed by a further peptizing, eg by again acidifying to a pH of about 4 using acetic acid, and then stirring at an elevated temperature, eg at 80° C. for 20 minutes, to form a gel which can then be dried and ground. The material obtained via either spray-drying or via the gel can then be formed into beta″-alumina as described above.

The precursor of aluminium oxide may be calcined by heating to a temperature of 250°–1100° C., preferably 500°–1,050° C., prior to mixing with the soda and spinel stabilizer. Thus the as-received boehmite or other precursor may possibly, or sometimes preferably, be calcined by heating preferably to 500°–1,050° C. prior to mixing with the spinel-stabilizer and soda and heating to form beta″-alumina. In this case water and any other volatiles present will be driven off before the mixing. The calcining should be to a temperature sufficiently low to avoid any substantial alpha-alumina formation. As used herein, the term as-received means that the substance such as the boehmite in question, is used in its condition substantially as received from the source or supplier thereof; and the term as-received is used in particular to contrast the unaltered raw material received from the supplier with such raw material when it is optionally calcined as described above.

Heating may be according to a regime wherein the temperature of the boehmite is increased progressively to the maximum temperature to which it is heated, without any intermediate temperature peaks or plateaus. Thus, the heating may be according to a heating regime whereby the temperature of the mixture is progressively increased to a maximum temperature, and is thereafter cooled according to a cooling regime whereby the temperature of the heated product is progressively cooled to ambient temperature. The maximum temperature may be held for a predetermined period, after which said cooling take place, and the heating of the mixture may be to a maximum temperature of at least 1,100° C.

When the method is used merely to form beta″-alumina, heating will typically be a temperature lower than that required to form an artifact, whereas for forming an artifact the heating will be at least to a temperature sufficient to cause enough sintering and densification to form a unitary self-supporting artifact comprising essentially beta″-alumina. Thus, for artifact manufacture, heating of the mixture may be to a maximum temperature, typically above 1,200° C., sufficient to form a unitary self-supporting mass from the mixture. When an artifact is to be made, the mixture may be formed in a green state into an artifact, prior to the heating of the mixture. The mixture in dry powder form, containing less than 10% by mass moisture, may be formed into the artifact by pressing to a pressure of 5,000–100,000 psi (1 psi = 6.894757 × 10$^3$ Pa). The pressing may be isostatic pressing and may be to a pressure of 30,000–60,000 psi. However, while isostatic pressing to a pressure of typically above 30,000 psi will usually be employed, on dry powders obtained eg from spray drying, uniaxial pressing or die pressing of the dried powder may instead by employed. Milling of the constituents to mix them will thus typically be to form a slip having a solids content of about 50% by mass, suitable for spray drying, followed by spray drying to about 2–10% by mass moisture.

For making an artifact, heating the mixture may be to a maximum temperature of 1,550°–1,700° C., typically 1,600°–1630° C. and preferably 1,610°–1620° C. The rate of heating of the mixture may be between 150° and 300° C./hr from a temperature of at least 550° C. up to a temperature not closer than 100° C. to said maximum temperature, and then at a rate of at most 100° C./hr until the maximum temperature has been reached. The rate of heating of the mixture from ambient temperature up to said temperature of at least 550° C. is preferably at most 100° C./hr.

The average rate of heating the mixture for ambient temperature up to maximum temperature may thus be at most 300° C./hr.

When the starting precursor of aluminium oxide, such as boehmite or bayerite is used as-received to form an artifact, the mixture which is heated may thus have its temperature increased at a relatively low average rate of less than 100° C./hr, eg 60° C./hr, according to normal ceramic practice, until all the free water, bound water and any other volatiles have been driven off at a temperature of say 550°–650° C., after which the rate of temperature increases may be raised to said value of 150°–300° C. until shortly before the maximum temperature is reached (but not closer than 100° C. to said maximum temperature), after which the rate is decreased to a relatively low rate of less than 100° C./hr, eg 60° C./hr. The initially low rate of temperature rise is to resist any cracking or physical damage to the artifact, the final low rate of heating being to promote densification and to promote an even temperature profile throughout the heated artifact.

When the precursor such as boehmite or bayerite has been pre-calcined, heating to form beta"-alumina may immediately commence, after dispersion in said precursor of the soda and spinel-stabilizer, at the above high rate of 150°–300° C./hr from ambient and may continue at this rate until shortly (but not less than 100° C.) before the maximum temperature is reached.

Indeed, when the precursor of aluminium oxide has been pre-calcined, relatively extremely high average heating rates for firing can be employed. Thus, the precursor of aluminium oxide may be calcined by heating to a temperature of 250°–1,100° C., prior to mixing with the soda and spinel stabilizer, the average rate of heating being above 50° C./min. These high rates of heating can be obtained for example when the green artifacts, after mixing with the soda and spinel stabilizer, are inserted directly into a furnace which is already at substantially the maximum temperature to which it is intended to fire the artifact. Depending on the size, shape, material thickness, etc of the artifact, much higher average heating rates can be obtained, up to 100°–400° C./min, eg 150°–170° C./min.

When it is not intended to produce an artifact, but merely a powder or particulate material containing beta"-alumina, the initial low rate of temperature increase can be dispensed with, as can the final relatively low rate of temperature increase, and the maximum temperature can naturally be lower.

The lower limit of the maximum temperature is set by factors such as an acceptable electrical resistivity in the final artifact, for example for use as a solid electrolyte or separator in an electrochemical cell, and sufficient sintering and strength in the final artifact. Below about 1,600° C. maximum temperature the electrical resistivity in the final product will be increased and in particular the strength of the artifact may be unacceptably low, for example for use as a solid electrolyte or separator in an electrochemical cell.

When heating is merely to form beta"-alumina in powder or particulate form, the maximum temperature may be substantially lower, eg to at least 1,200° C. or possibly somewhat less. In this case the maximum temperature will be selected by a trade off between the amount of beta"-alumina produced and factors such as power consumption, materials of construction necessary for the furnace, etc. Spinel-stabilizers will generally be employed for artifact manufacture, and they will also be used, possibly in reduced proportions when the product is produced as a flowable partially processed material intended to be stored for an indeterminate period for eventual use in artifact manufacture.

A typical heating regime which has been used for artifact manufacture involves heating as-received hydrothermally prepared boehmite such as Cera Hydrate, together with the soda and spinel-stabilizer dispersed therein, at a rate of 60° C./hr from ambient temperature up to 600° C., then at 200° C./hr from 600° C. up to 1,400° C., and then at 100° C./hr up to about 15° C. below the maximum temperature, the final rate being at about 60° C./hr for the last 15 minutes or so. The changes from 200° C./hr to 100° C./hr at 1,400° C. and from 100° C./hr to 60° C./hr at about 15° C. below the maximum temperature were dictated by the characteristics of the furnace used, and had the furnace been capable of maintaining a rate of 200° C./hr until the maximum temperature was reached, there would have been no change from 200° C./hr to 100° C./hr at 1,400° C., or to 60° C./hr at 15° C. below the maximum temperature.

A heating regime which has also been successfully employed by the Applicant in tests however involves simply heating calcined boehmite starting material into which has been dispersed the soda and spinel-stabilizer, and which was obtained via spray-drying as described above, at a rate of 200° C./hr, and maintaining the final temperature reached for a suitable period, eg 30 minutes, and cooling at the same rate.

Heating may be in a furnace, eg an electric furnace or possibly a gas-fired furnace, heated up with the sample from ambient temperature to the maximum temperature, or it may be in a furnace maintained at the maximum temperature and through which the sample heated is moved at an appropriate rate, in which case the furnace may be electric.

Heating will typically take place under a soda atmosphere, and the sample heated may be located in a suitable corrosion resistant refractory container, such as a magnesium oxide or platinum crucible or tube, which may be closed.

The mixture which is heated may comprise alpha-alumina, and this alpha-alumina may be present in a proportion of at most 95% by mass of the precursor of aluminium oxide in the mixture which is heated, preferably in a proportion of at least 5% by mass of said precursor of aluminium oxide in the mixture which is heated. In other words, the ratio of alpha-alumina to said precursor of aluminium oxide, by mass, may be between 95:5 and 5:95. In this fashion, alpha-alumina, which when heated to the temperatures in question, will replace the equivalent proportion of said precursor for aluminium oxide, ie it will act as a diluent therefor. Alpha-alumina also converts to beta"-alumina when heated in similar fashion to the temperatures in question, but to produce substantially lower proportions of beta"-alumina than the precursor starting materials such as boehmite and bayerite of the present invention. It would thus be expected that a mixture of alpha-alumina and a precursor such as boehmite or bayerite would provide a product having a beta"-alumina content greater than that which would be obtained from heating alpha-alumina by itself (with soda and a spinel-stabilizer) and less than that which would be obtained by heating say boehmite or bayerite by itself (with soda and a spinel-stabilizer), the proportion of beta"-alumina obtained being proportional to the respective proportions of alpha-alumina on the one hand, and of boehmite or bayerite on the other hand. Surprisingly, synergism appears to take place, and the actual proportions of beta"-alumina obtained are higher than would be obtained merely from the separate heating of the alpha-alumina and precursor (boehmite or bayerite) in the mixture, ie by themselves, with soda and a spinel-stabilizer.

Instead, in similar fashion, the mixture which is heated may comprise gibbsite again in a proportion eg between 5% and 959% by mass, say 80% by mass of the precursor of aluminium oxide in the mixture which is heated. In other words the ratio of gibbsite to the precursor may be between 5:95 and 95:5, eg 80:20.

By gibbsite is meant the monoclinic form of aluminium oxide trihydrate whose crystal lattice structure has the symmetry which is defined by the space group $C_{2h}^5$ as defined by H. Saalfeld, Neues. Jahrb. Mineral., Abh., 95, 1–87 (1960).

The invention extends also to beta"-alumina, particularly in the form of a unitary self-supporting mass or artifact whenever made according to the method described above.

The invention will now be described, by way of example, with reference to the following non-limiting illustrative examples.

EXAMPLES 1–11

In each of the following Examples 1–11 beta"-alumina artifacts were made in the form of tubes or hollow cylinders, suitable for use as solid electrolytes/separators in electrochemical cells. The tubes are pressed from a spray dried powder starting material (less than about 10% moisture) by means of an isostatic press at a pressure of about 35,000 psi. They were pressed to have an inner diameter of 33 mm, an outer diameter of 37 mm and a length of about 200 mm.

In each case Cera Hydrate boehmite was used as the precursor of aluminium oxide and about 8–10 kg of the boehmite starting material (whether as-received or pre-calcined) was wet milled in a vibro-energy mill (to a slip of about 50% by mass moisture) for a period of between 2 and 10 hours and so that a proportion of the particles by mass had a particle size of less than 30 microns (30,000 Angstrom units), 80% by mass thereof having a particle size of less than 55 microns (55,000 Angstrom units). Soda was added as NaOH and lithia as (LiOH.H$_2$O) was used as the spinel-stabilizer. The slip was spray dried to about 2–10% moisture powder prior to pressing.

The boehmite used was ex-factory as produced as an intermediate in the refining of aluminium from bauxite. When it was pre-calcined, this calcining was effected by rapidly heating (200° C./h) the as-received boehmite in an electric furnace in air to the temperature at which water is evolved, slowing the heating rate to allow the water to de driven off, and then continuing the rapid heating to the calcining temperature and maintaining the temperature for 1 hour, after which it was immediately permitted to cool to ambient temperature before milling.

The heating regime used for beta"-alumina production from as-received boehmite was at an average rate of 60° C./hr up to 600° C.; 200° C./hr from 600° C. up to 1,400° C.; 100° C./hr from 1,400° C. up to 15° C. before the maximum temperature; and 60° C./hr for the last 15° C. The heating regime used for beta"-alumina production from calcined boehmite was 200° C./hr from ambient up to 1,400° C., 100° C./hr from 1,400° C. up to 15° C. before the maximum temperature, and 60° C./hr for the last 15° C. Heating was in an electric furnace in a container made of magnesium oxide and samples after heating were, unless otherwise specified, cooled in the furnace by switching off the furnace. In this regard it should be noted that in magnesia containers or crucibles, a soda-rich atmosphere is typically self-generated, which atmosphere is desirable for the firing. Although not generally necessary, some soda, eg as powder, may be added if desired to the crucible or container to promote the formation of the soda-rich atmosphere.

The proportions of soda and lithia in the mixture which were fired are given on the basis of the mixture after firing, ie after the boehmite is dehydrated.

Various batches were tested, with varying formulations and processing conditions and comparative tests were conducted with different starting materials.

EXAMPLE 1

As-received boehmite was calcined to 700° C. after which it was vibro-energy milled with a soda precursor and a lithia precursor (to provide a spinel-stabilizer) (respectively to give after firing 9.10% by mass soda and 0.65% by mass lithia on a dry basis). This slip was spray dried (to a powder containing 1.6% by mass moisture and 30% by mass of which was less than 30 microns in size) and pressed into tubes which were fired respectively to maximum temperatures of 1,615° C. and 1,607° C. After cooling to ambient temperature the products were found to be unitary sintered beta"-alumina tube artifacts comprising on average 98% by mass beta"-alumina and 2% by mass beta-alumina. They had an average outside diameter of 29.60 mm and an average inside diameter of 26.25 mm. Their density was 3.16 g/ml and they had an axial resistivity (in the axial direction) at 350° C. of 4.71 ohm cm. Samples fired at 1,200° C. with a dwell at 1,200° C. of 6 minutes comprised 92% by mass beta"-alumina and 8% by mass beta-alumina and samples fired to 1,400° C. with a dwell at 1,400° C. of 6 minutes comprised 95% by mass beta"-alumina and 5% by mass beta-alumina.

EXAMPLE 2

Example 1 was repeated except that the as-received boehmite was calcined to 550° C., the starting mixture had a soda content after firing of 8.49% by mass and a spinel-stabilizer content after firing of 0.60% (as lithia), and was fired to 1,615° C. The fired tubular artifacts produced had an outside diameter of 30.83 mm, and were found to comprise substantially 100% by mass beta"-alumina. Moisture content of the spray dried starting material was 4% by mass. The inner diameter of the artifact, the fired density and the axial resistivity were not measured.

EXAMPLE 3

Example 1 was repeated employing 8.22% by mass soda and 0.6% spinel-stabilizer (as lithia). Firing was to 1,615° C. and artifacts were obtained comrising substantially 100% by mass beta"-alumina and having an outside diameter of 30.84 mm. The moisture content of the spray-dried starting material was 4.2% by mass. The inside diameter, fired density and resistivity of the artifacts were not measured.

EXAMPLE 4

Example 1 was repeated except that the as-received boehmite was previously calcined to 1,060° C., and the soda addition was 8.02% by mass and the spinel-stabiliser addition was 0.57% (as lithia). In each case the artifacts produced were found to comprise 93% beta"-alumina by mass and 7% beta-alumina and an outside diameter of 33.1 mm. Once again, the moisture content of the spray-dried starting mixture and indeed the particle size of the starting mixture were not measured, and once again the inside diameter, fired density and resistivity of the artifacts were not measured. This Example shows that too high a calcining temperature, can lead to an inferior product as regards beta″-alumina content.

EXAMPLE 5

Example 1 was repeated with uncalcined boehmite which had been vibro-milled for 6 hours so that 30% thereof by mass had a particle size smaller than 30 microns. The proportion of soda added was 8.16% by mass and the proportion of spinel-stabilizer was 0.68% by mass (as lithia). Artifacts were obtained comprising 98% by mass of beta″-alumina and 2% by mass of beta-alumina, with a 35.15 mm outside diameter. The moisture content of the spray dried starting material was 1.3% by mass and 30% by mass of this material had a particle size of less than 30 microns. The inside diameter, fired density and resistivity of the artifacts were not measured.

EXAMPLE 6

Example 5 was repeated except that the milling took place for 10 hours, and the soda addition was 8.02% by mass with the spinel-stabilizer addition being 0.58% by mass (as lithia). Artifacts were obtained having an outside diameter of 34.25 mm, and a beta″-alumina content of 96% by mass, the balance of 4% being beta-alumina. The moisture content of the spray dried starting material was 1.4% by mass and 30% by mass of this material had a particle size of less then 30 microns. The inside diameter, fired density and resistivity of the artifacts were not measured.

EXAMPLE 7

Example 5 was repeated except that 20% by mass of the boehmite was replaced by the same mass of the boehmite which had been calcined to 700° C., the soda addition being 7.82% by mass and the spinel-stabilizer addition being 0.57% by mass (as lithia). Milling time was 2 hours. 30% of the spray dried starting material by mass was less than 30 microns in size. Moisture content of the spray dried starting material was 1.8% by mass. The inside diameter, fired density and resistivity of the final artifacts were not measured. The artifacts produced had an outside diameter of 36.48 mm and a beta″-alumina content of 95% by mass, the balance comprising 5% by mass of beta-alumina.

EXAMPLE 8

Example 5 was repeated but with the spray drying to 4.9% moisture by mass and with 30% of the spray dried powder being less than 30 microns in size. Soda was added at 10% by mass and no spinel-stabilizer was added. The artifacts had a green density of 1.68 g/ml, and a fired density of 3.17 g/ml (calculated). The tubes obtained had an outside diameter of 29.56 mm, an inside diameter of 26.46 mm, and a beta″-alumina content of 96% by mass, the balance being 4% beta-alumina, and the tubes having a Bortz ring diametral strength of 260 MNm$^2$, determined by applying a load across the diameter of short ring sections.

EXAMPLE 9

Example 1 was repeated with boehmite calcined to 750° C. The soda added was 10% by mass (experimentally measured at 9.22% by mass). The spray dried powder had a moisture content of 2.7% by mass and 27% by mass thereof was of a particle size less than 30 microns. The green artifacts had a density of 1.47 g/ml. The fired artifacts had a density of 3.198 to 3.200 g/ml, an outside diameter of 29.19 mm and an inside diameter of 26.07 mm. They comprised 96% by mass of beta″-alumina and 4% by mass of beta-alumina, having an axial resistivity at 350° C. of 4.53 ohm cm and a radial resistivity at this temperature of 5.57 ohm cm, with a diametral strength of 230 MNm$^2$. Five tubes prepared according to this example were incorporated into sodium/sulphur electrochemical secondary power storage cells for life tests. For the first 386 cycles their charge/discharge rates were respectively 469 mAcm$^{-2}$/572 mAcm$^{-2}$ giving 16 charge/discharge cycles a day. These rates were then increased respectively to 625 mAcm$^{-2}$/729 mAcm$^{-2}$ giving 28 charge/discharge cycles a day. Three cells failed respectively after 90, 494 and 2,300 cycles. Two cells were taken off test after 2,798 cycles, without having failed.

EXAMPLE 10

Example 1 was repeated employing boehmite calcined to 700° C., the spray dried starting material having a moisture content of 3.8% by mass and 27% by mass thereof having a particle size of less than 30 microns. The soda used was 9.5% by mass introduced as sodium carbonate (experimentally measured as 9,09% by mass soda), the green artifacts having a density of 1.47 g/ml. The fired artifacts were found to have a density of 3.195 g/ml, with an outside diameter of 29.18 mm and an inside diameter of 25.94 mm. The fired artifacts had a beta″-alumina content of 94% by mass and a beta-alumina content of 6% by mass. At 350° C. they had an axial resistivity of 3.92 ohm cm and a radial resistivity of 5.26 ohm cm, their diametral strength being found to be 260 MNm$^2$.

Five tubes prepared according to this example were, similarly to Example 9, incorporated into sodium/sulphur life test cells. For the first 450 cycles they were run at charge/discharge rates of 469 mAcm$^{-2}$/572 mAcm$^{-2}$, ie 16 cycles a day. Four cells failed respectively after 256, 501, 502 and 516 cycles, one being taken off test, without failing, after 3,043 cycles.

EXAMPLE 11

As-received boehmite had 8.29% by mass soda added thereto and 0.62% by mass spinel-stabilizer (as lithia). The moisture content of the spray-dried starting material was 3.4% m/m and 33% by mass of this powder had a particle size of less than 30 microns. The artifacts produced had an outside diameter of 31.75 mm and a beta″-alumina content of 98% by mass, the balance of 2% by mass comprising beta-alumina.

In examples 8 to 11 above, the firing was to a maximum temperature of 1,615° C., and the fired density was calculated on the basis of dimensions and weights of the samples, confirming determinations by Archimedean methods.

EXAMPLES 12–15

Comparative tests were carried out to compare the preparation of beta″-alumina from Cera Hydrate boehmite in accordance with the method of the present invention with attempts to form beta″-alumina from other similar starting materials. The raw starting material in accordance with the present invention was the Cera Hydrate boehmite mentioned above, and the other raw materials were as follows:

"RC-HP-DBM" alpha-alumina available from the Reynolds Company, Arkansas, U.S.A.;

"Catapal" pseudoboehmite available from Conoco Chemicals Division, Houston, Tex., U.S.A. and having a specific surface area of 280 m$^2$/g measured by nitrogen adsorption, and an average crystallite size of approximately 40 Angstrom units, which was not hydrothermally prepared, but was prepared by the hydrolysis of aluminium isopropoxide; and A boehmite (aluminium monohydrate) synthesized by the hydrolysis of aluminium isopropoxide at 80° C. according to the method of Yoldas (B E Yoldas, American Ceramic Society Bulletin, 54, 286–288 (1975)), which material was reported by Yoldas to have a specific surface area of 200 m$^2$/g and an average crystallite size of about 70 Angstrom units, this material therefore resembling Catapal boehmite somewhat in this regard.

BRIEF DESCRIPTION OF DRAWING

Figure 2:
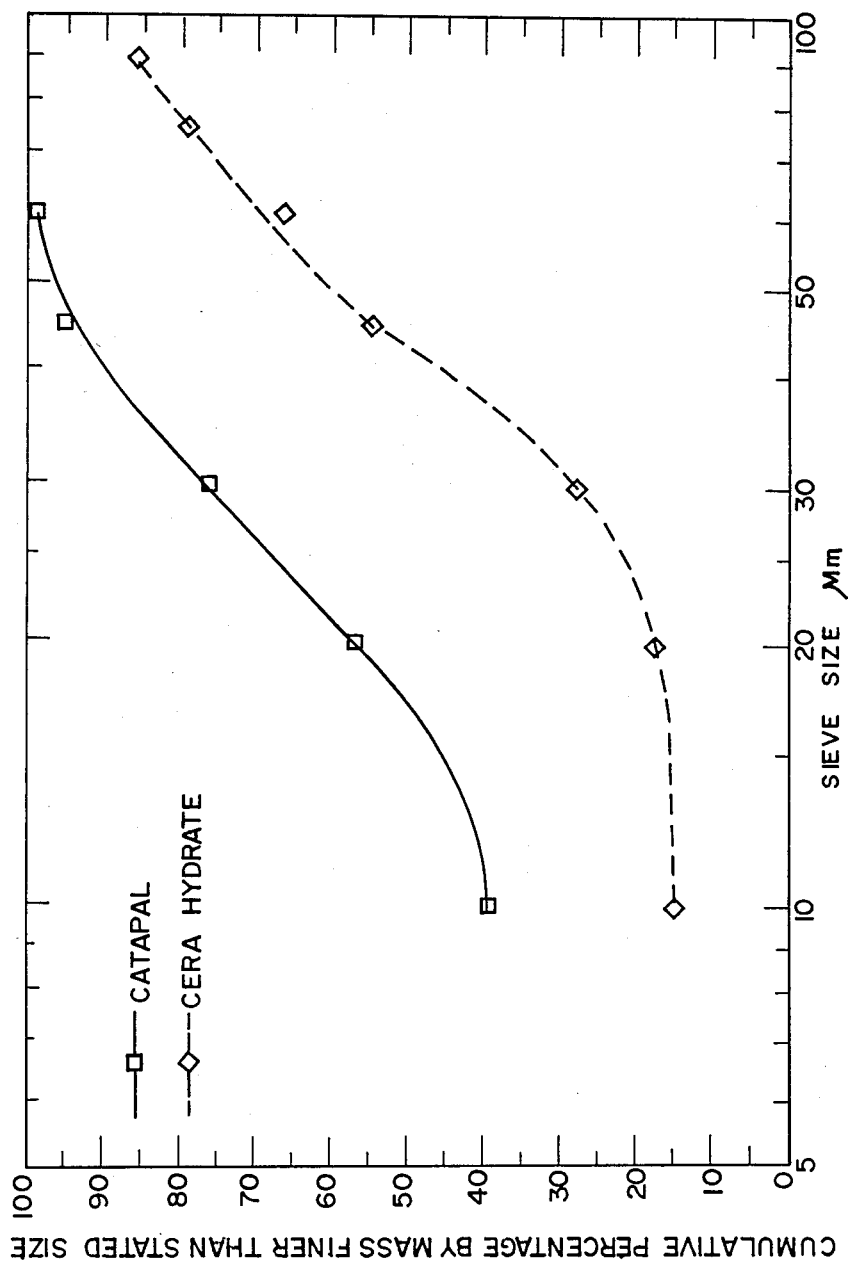
Figure 3:
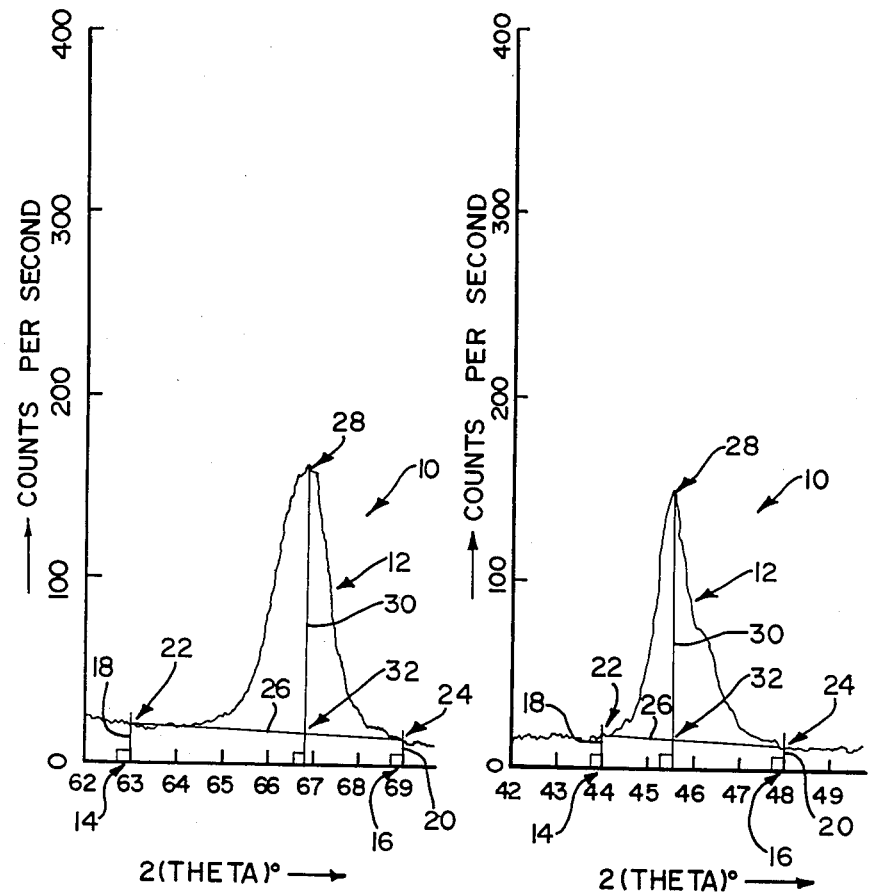

In FIG. 2 of the annexed drawings is shown the particle size distribution of the as received Cera Hydrate and Catapal boehmite before milling, being a log-linear plot of the cumulative percentage by mass of particles finer than the stated size against sieve size in microns.

Starting mixtures for the preparation of beta"-alumina were prepared in two ways. One way was to spray dry an aqueous slurry containing the raw material with dissolved sodium hydroxide and lithium hydroxide therein. The sodium hydroxide acted as a precursor for sodium oxide in the mixes, and the lithium hydroxide acted as a precursor for a lithia spine-forming oxide. The other way was to use a sol gel process employing acetic acid as a peptizing agent. All mixtures were prepared to contain the equivalent of 84 mole % $Al_2O_3$, 14 mole % $Na_2O$ and 2 mole % $Li_2O$. This composition corresponds to the formula $6Al_2O_3.Na_2O$, which approximates the formula $5.33Al_2O_3.Na_2O$ for ideal beta"-alumina (excluding the spinel stabilizer).

As regards the spray dried mixes, those prepared from the RC-HP-DBM, the Catapal and the Cera Hydrate were prepared by mixing 100 g thereof with the same mass of distilled water containing the required sodium hydroxide and lithium hydroxide dissolved therein, to obtain a slurry containing 50% by mass raw material solids. Mixing took place by ball milling in polyethylene containers using an alpha-alumina grinding medium for a period of 30 minutes, after which they were immediately spray dried. The resulting powders were highly hygroscopic and were stored after drying in a vacuum disiccator. The mix containing the hydrolysis product of aluminium isopropoxide as raw material, was prepared by dissolving about 100 g of aluminium isopropoxide in 250 ml chloroform. This solution was introduced dropwise into 900 ml distilled water at a temperature above 75° C. with vigorous stirring. Reaction occured to form a colloidal suspension of the boehmite material which was stirred at 80° C. for 12 hours under reflux to ensure completion of the reaction. The required amounts of sodium hydroxide and lithium hydroxide were dissolved in a minimum amount of distilled water (about 100 ml). Excess alcohol (about 500 ml) was added to this solution, which was then added to the colloidal suspension. The resulting suspension was immediately spray dried.

The gel made from the RC-HP-DBM raw material was prepared by dispersing 50 g thereof in 200 ml distilled water by ball milling in a polyethylene container for 30 minutes using 200 g of alumina grinding medium. The resultant slurry was acidified to a pH of about 3 using glacial acetic acid. The sodium hydroxide and lithium hydroxide were then added in a further 40 ml of distilled water with stirring. The solution was then adjusted to a pH of about 3.5 using more of the acetic acid and the mixture was evaporated to dryness on a hot plate with continuous stirring. It is to be noted that a true gel was not formed in this case, the slurry merely becoming more viscous as it dried until it could no longer be stirred.

The gels from the Catapal and Cera Hydrate raw material were prepared by mixing 50 g of the raw materials in each case with 200 ml water with a magnetic stirrer, followed by acidification to a pH of 4 using glacial acetic acid. This suspension was then milled as described above for the RC-HP-DBM raw material, the resultant slurries being placed on the magnetic stirrers with the sodium hydroxide and lithium hydroxide being added as a solution in 40 ml distilled water. The pH was then adjusted to about 4 using glacial acetic acid, followed by stirring at 80° C. for 20 minutes until the mixtures had gelled. The gels were then ground and dried in a mortar and pestle.

The synthetic pseudoboehmite raw material obtained from aluminium isopropoxide was obtained by dissolving 100 g of aluminium isopropoxide in 250 ml chloroform. This solution was added dropwise into 900 ml distilled water at a temperature above 75° C. with vigorous stirring. The suspension which formed had 15 g glacial acetic acid added thereto as a peptizing agent after 30 minutes, and the resultant sol was stirred at 80° C. for 36 hours to affect peptization. A reflux condensor was used to prevent solvent evaporation. Lithium hydroxide and sodium hydroxide were added as a solution in 100 ml of distilled water. Gelling occured in about 10 to 20 seconds, the gel then being dried and ground in a mortar and pestle.

The eight mixes, namely the four spray dried mixes and the four mixes obtained from the gels respectively having RC-HP-DBM, Catapal, Cera Hydrate and synthetic pseudoboehmite as raw materials, were then subjected to calcining at various temperatures. In each case the heating and cooling rate was 200° C./h. In each case the maximum temperature obtained was maintained for a period of 30 minutes. The temperatures to which heating took place were respectively 500° C., 700° C., 900° C., 1,200° C. and 1,400° C. The products obtained after the heating/calcining were then subjected to an X-ray diffraction study to determine the presence or absence of beta"-alumina therein. These results are discussed in the following Examples.

EXAMPLE
12—(CONTROL—ALPHA-ALUMINA)

For the RC-HP-DBM raw material heating at temperatures up to 900° C. produced no beta"-alumina, whether the starting material was obtained by spray drying or via the sol gel. When the starting mixture obtained from the sol gel was heated to 1,200° C., a mixture was obtained containing no alpha-alumina, some gamma sodium aluminate, some beta-alumina and some beta"-alumina, the beta"-alumina making up about 30% by mass thereof. The product obtained by heating the starting mixture derived from the sol gel to 1,400° C. similarly contained no alpha-alumina, while it contained only beta-alumina/beta"-alumina, comprising about 41% mass beta"-alumina.

The product obtained by heating the spray dried mixture to 1,200° C. was essentially similar, again containing no alpha-alumina but containing some gamma sodium aluminate, some beta-alumina and some beta''-alumina, the beta''-alumina making up about 40% by mass. When the spray dried mixture was heated to 1,400° C., there was again no alpha-alumina, and in this case no gamma sodium aluminate, the product comprising a mixture of beta-alumina and beta''-alumina, with the beta''-alumina making up about 42% by mass.

EXAMPLE 13 (CONTROL—CATAPAL)

In the case of the Catapal pseudoboehmite raw material, when the starting mixture obtained either via the sol gel or by spraying drying was heated to temperatures up to 900° C., there was no formation of beta''-alumina.

When heating took place to 1,200° C. and 1,400° C., the products obtained whether from the mixture derived from the sol gel or from spray drying were essentially similar. The products obtained were found to contain some gamma sodium aluminate, some beta-alumina and some beta''-alumina. Because of the diffuse nature of the peaks obtained in the X-ray diffraction, it was impossible to quantify the relative proportions of beta-alumina and beta''-alumina.

EXAMPLE 14 (CONTROL—SYNTHETIC PSUEDOBOEHMITE))

Once again, in this case no beta''-alumina was obtained in the product for heating up to temperatures of 900° C., whether the starting mix was obtained via the sol gel or by spray drying.

For the starting mix obtained via the sol gel, heating to 1,200° C. and heating to 1,400° C. respectively resulted in a product which contained some beta-alumina and some beta''-alumina, the proportions thereof being impossible to quantify by X-ray diffraction.

In the case of the spray dried starting mix up to 1,200° C. and 1,400° C., similar products were obtained, containing however some gamma sodium aluminate in addition to the beta-alumina and beta''-alumina.

EXAMPLE 15 (INVENTION—CERA HYDRATE)

Once again no beta''-alumina was obtained for heating to temperatures up to 900° C.

For heating to 1,200° C. and heating to 1,400° C. for both the starting mix obtained via the sol gel and by spray drying, products were however obtained comprising essentially 100% beta''-alumina. The reaction product obtained by the sol gel technique had, on average, broader X-ray diffraction peaks than the spray dried product, indicating a smaller mean crystallite size.

EXAMPLES 16-26

Various tests were carried out to demonstrate the utility of the present invention for making beta''-alumina artifacts from mixtures of precursors of aluminium oxide such as Cera Hydrate boehmite, which are useful for the method of the present invention and have A/S and B/S values complying with equations (I) and (II), with alpha-alumina. These tests were contrasted with certain controls.

Four different firing schedules or regimes were employed, namely:

1st Firing Regime:
  ambient (20° C.)–1,100° C. at 100° C./hr
  1,100° C. hold for 3 hrs.
  1,100°–1,200° C. at 100° C./hr.
  1,200° C. hold for 6 minutes.

2nd Firing Regime:
  20°–1,100° C. at 100° C./hr.
  1,100°–1,200° C. at 25° C./hr.
  1,200° C. hold for 6 minutes.
3rd Firing Regime:
  20°–1,100° C. at 100° C./hr
  1,100° C. hold for 3 hrs.
  1,100°–1,605° C. at 100° C./hr.
  1,605°–1,615° C. at 60° C./hr.
  1,615° C. hold for 15 minutes
4th Firing Regime:
  20°–1,100° C. at 100° C./hr.
  1,100°–1,200° C. at 25° C./hr.
  1,200°–1,605° C. at 100° C./hr.
  1,605°–1,615° C. at 60° C./hr.
  1,615° C. hold for 15 minutes.

In each case (unless otherwise specified) any alpha-alumina used was that available from Alcoa (Great Britain) Limited, Droitwich, Great Britain under the trade designation A16SG. Any bayerite used was obtained from BA Chemicals Plc, Gerrards Cross. Buckinghamshire, Great Britain; and any theta-alumina used was obtained by heating this bayerite in powder form to about 1,000° C. Soda (as NaOH) and lithia (as LiOH.H$_2$O) precursors were used in various proportions, also in powder form. Starting mixtures were moistened with deionized water to a solids content of about 50% by mass, and vibro-milled to produce a slip. The slip was spray dried with a Niro atomiser spray drier available from Niro Atomizer Limited, Watford, Great Britain to produce a spray dried powder having a moisture content of about 2% by mass. In each case the powder was sieved through a sieve having 45 micron apertures to remove any large agglomerated particles, and artifacts in the form of closed-ended tubes, suitable for use as solid electrolytes or separators in electrochemical cells, were isostatically pressed at 35,000 psi (about 240 MPa) (unless otherwise specified) to have dimensions (unless otherwise specified) of:

| Inside Diameter | 33 mm |
| Outside Diameter | 37 mm |
| Length | 200 mm |

These artifacts were fired accordingly to one or another of the above firing regimes, in magnesia crucibles under a soda atmosphere and, unless otherwise specified, were furnace cooled by switching off the furnace.

EXAMPLE 16—CONTROL

Three sample batches were prepared comprising respectively one of alpha-alumina and two mixtures of alpha-alumina and theta-alumina in different proportions, with soda and lithia spinel stabilizer as set out in Table 1 below.

TABLE 1

| Batch No | 1 | 2 | 3 |
|---|---|---|---|
| Constituents | % by mass | % by mass | % by mass |
| alpha-alumina | 90.4 | 85.4 | 80.4 |
| theta-alumina | 0.0 | 5.0 | 10.0 |
| soda (as NaOH) | 8.9 | 8.9 | 8.9 |
| Lithia (as NiOH.H$_2$O) | 0.7 | 0.7 | 0.7 |

Tubes were prepared from these batches according to the method described above and were fired according to the firing regimes set out above. The proportion (% by mass) of beta''-alumina in the fired tubes was then determined and results are set out in Table 2 below.

TABLE 2

| Firing Regime | Batch No | | |
|---|---|---|---|
| | 1 | 2 | 3 |
| | % by mass beta''-alumina | | |
| 1st | 39 | 45 | 50 |
| 2nd | 44 | 46 | 53 |
| 3rd | 81 | 83 | 79 |
| 4th | 82 | 83 | 82 |

These tests show that substituting theta-alumina for some of the alpha-alumina gives a material increase in beta''-alumina in the fired tube when heated to a maximum of 1,200° C., but not when heated to a maximum of 1,615° C., there being no significant differences between the batches when heated to the higher temperature. Heating to 1,615° C. in each case gave more beta''-alumina in the product tubes than heating to 1,200° C.

EXAMPLE 17

In this example, various batches comprising mixtures of different proportions of Cera Hydrate boehmite and alpha-alumina were prepared, the boehmite first having been calcined to 1,100° C., with the batches each containing 8.9% by mass soda (as NaOH) and 0.7% lithia as (LiOH.H$_2$O). The batches were prepared in the same fashion as for Example 16, and were pressed in the same fashion into tubes. The proportions of constituents in these batches is set out in Table 3.

TABLE 3

| Constituents | Batch No | | | | |
|---|---|---|---|---|---|
| | 4 | 5 | 6 | 7 | 8 |
| | % by mass | % by mass | % by mass | % by mass | % by mass |
| alpha-alumina | 90.4 | 86.83 | 83.26 | 76.11 | 61.83 |
| calcined boehmite | 0.0 | 3.57 | 7.14 | 14.29 | 28.57 |
| soda (as NaOH) | 8.9 | 8.9 | 8.9 | 8.9 | 8.9 |
| Lithia (as LiOH.H$_2$O) | 0.7 | 0.7 | 0.7 | 0.7 | 0.7 |

These tubes were then fired according to the various firing regimes set out above, and the proportion of beta''-alumina produced in the tubes was in each case determined, as set out in Table 4.

TABLE 4

| Firing Regime | Batch No | | | | |
|---|---|---|---|---|---|
| | 4 | 5 | 6 | 7 | 8 |
| | % by mass beta''-alumina | | | | |
| 1st | 39 | N/D | 50 | N/D | 65 |
| 2nd | 44 | N/D | 50 | N/D | 65 |
| 3rd | 78 | N/D | 80 | 82 | 85 |
| 4th | 76 | N/D | 80 | 81 | 83 |

(N/D - no determination carried out)

The tubes fired according to the 4th firing regime were tested for Bortz ring diametrical strength and these results are set out in Table 5.

TABLE 5

| | Batch No | | | | |
|---|---|---|---|---|---|
| | 4 | 5 | 6 | 7 | 8 |
| | | | MPa | | |
| Average Diametrical Strength (MPa) According to Bortz ring test | 158 | 199 | 220 | N/D | 213 |
| Standard Deviation | 15 | 16 | 18 | | 26 |

From this example is appears that substituting some calcined boehmite for some of the alpha-alumina leads to a progressive increase in beta''-alumina in the product tubes. The increase obtained for the 1st and 2nd firing regimes is maintained for the 3rd and 4th firing regimes, although it is not as marked for the 3rd and 4th firing regimes, as for the 1st and 2nd firing regimes. Furthermore strengths of the tubes appear to be increased by the substitution of calcined boehmite for various proportions of the alpha-alumina. As regards the increase in beta''-alumina in the tubes obtained by the substitution, this increase is, for Batches 6 and 8, greater than would be expected for the 1st and 2nd firing regimes, indicating synergism. The total proportion of beta''-alumina in the tubes being higher than would be obtained by merely adding together the beta''-alumina expected to be obtained from the alpha-alumina, and the beta''-alumina expected to be obtained from the boehmite. Thus, for Batches 6 and 8 for example, for the 1st and 2nd firing regimes, the actual proportions of beta''-alumina apparently contributed by the calcined boehmite, and the ratios between these proportions and the proportions which would be expected to be contributed thereby were respectively 12.95% and 2.59:1 for Batch 6 and for the 1st firing regime; 33.8% and 1.69:1 for Batch 8 and for the 1st firing regime; 8.2% and 1.64:1 for Batch 6 and for the 2nd firing regime; and 29.8% and 1.49:1 for batch 8 and for the 2nd firing regime.

EXAMPLE 18

In this example comparative tests were conducted employing Cera Hydrate boehmite, the bayerite referred to above and obtained from BA Chemicals and a reactive calcined alpha-alumina available as grade RC-HPS-DBM from Reynolds Chemicals, Malakoff, Tex., U.S.A. Samples of the Cera Hydrate and bayerite were tested both as received and after calcining respectively to 700° C. and 1000° C. for 1 hr. Spray dried powders were prepared as in Example 16 from the alpha-alumina alone, and from mixtures thereof with the Cera Hydrate and bayerite (as received and as calcined) and soda and lithia were added as NaOH and LiOH.H$_2$O. The mixtures to which the lithia and soda were added are set out in Table 6.

TABLE 6

| BATCH No Constituents | 9 | 10 | 11 | 12 | 13 | 14 | 15 |
|---|---|---|---|---|---|---|---|
| | % by mass | | | | | | |
| RC-HPS-DBM alpha alumina | 100 | 80 | 80 | 80 | 60 | 60 | 80 |
| Calcined Cera Hydrate (1 hr, 700° C.) | | 20 | | | | | |
| Calcined bayerite (1 hr, 1,000° C.) | | | 20 | | | | |
| Bayerite (as received) | | | | 20 | 40 | | |
| Cera Hydrate (as received) | | | | | | 40 | 20 |

The as received Cera Hydrate and Bayerite are given above as excluding any free water or bound water of hydration.

From the mixtures set out in Table 7 tubes were pressed as described in Example 16 and were fired according to various firing regimes as follows:

5th firing regime:
 20°–500° C. at 50° C./hr
 500° C. hold for 1 hr.
 500°–600° C. at 50° C./hr.
 600°–1,100° C. at 100° C./hr.

1,100°–1,200° C. at 25° C./hr.
1,200°–1,605° C. at 100° C./hr.
1,605°–1,615° C. at 60° C./hr.
1,615° C. hold for 15 minutes.
6th firing regime:
   20°–500° C. at 50° C./hr.
   500° C. hold for 1 hr.
   500°–600° C. at 50° C./hr.
   600°–1,100° C. at 100° C./hr.
   1,100° C. hold for 3 hrs.
   1,100°–1,605° C. at 100° C./hr.
   1,605°–1,615° C. at 60° C./hr.
   1,615° C. hold for 15 minutes.
7th firing regime:
   20°–500° C. at 50° C./hr.
   500° C. hold for 1 hr.
   500°–600° C. at 50° C./hr.
   600°–1,100° C. at 100° C./hr.
   1,100°–1,200° C. at 25° C./hr.
   1,200°–1,597° C. at 100° C./hr.
   1,597°–1,607° C. at 60° C./hr.
   1,607° C. hold for 15 minutes.
8th firing regime:
   20°–500° C. at 50° C./hr.
   500° C. hold for 1 hr.
   500°–600° C. at 50° C./hr.
   600°–1,400° C. at 200° C./hr.
   1,400°–1,597° C. at 100° C./hr.
   1,597°–1,607° C. at 60° C./hr.
   1,607° C. hold for 15 minutes.

In each case the slow initial heating rate (50° C./hr max.) was to ensure removal of volatiles.

Properties of the fired tubes and the proportions of soda and lithia therein are given in Table 7, tube fracture strength being determined by the Bortz ring test.

which were smaller than those of Batch 9. In general, it is the crystals, especially the large crystals, which have the highest proportion of beta"-alumina in such fired products but a high proportion of large crystals usually leads to a reduction in strength.

Surprisingly, in the present Example, the batches containing Cera Hydrate not only had increased strength (usually associated with fewer smaller crystals), but also had very high proportions of beta"-alumina, (usually associated with more and larger crystals), ie Batches 10, 14 and 15. This surprising and desirable result is believed to arise from the fact that Cera Hydrate has the ability to transform, at 1,200° C., almost entirely to close to 100% beta"-alumina. In Batches 10, 14 and 15 it is thus believed that the Cera Hydrate dispersed in the alpha-alumina led to an increase in beta"-alumina content in the tubes at 1,200° C. and provided a plurality of crystal nucleation sites. Competitive crystal growth restricted eventual crystal size so that, in spite of there being high proportions of beta"-alumina, the tube strength was high. Furthermore, as the high levels of beta"-alumina production are initiated at 1,200° C. (see Example 16) there is considerable freedom to vary the firing regime employed, as convenient.

EXAMPLE 19

In this example various mixtures were prepared, according to the method described for Example 16, containing various proportions of Alcoa A-16SG alpha-alumina and Cera Hydrate boehmite, some of the latter of which had been calcined to 700° C. for 1 hr. Soda (as NaOH) and lithia (as LiOH.H$_2$O) were added thereto and tubes were isostatically pressed therefrom as described for Example 16 at 35,000 psi, the tubes being closed at one end having a length of 200 mm and an inside diameter of 33.3 mm. Details of the proportions

TABLE 7

| Batch No | 9 | 10 | 11 | 12 | 13 | 14 | 15 |
|---|---|---|---|---|---|---|---|
| Fired Density (g/cm$^2$) Firing regime | | | | | | | |
| 5th | 3.219 | 3.179 | 3.199 | 3.235 | 3.224 | 3.214 | 3.223 |
| 6th | 3.222 | 3.167 | 3.193 | 3.233 | 3.222 | 3.211 | 3.219 |
| 7th | 3.206 | 3.145 | 3.175 | 3.229 | 3.222 | 3.204 | 3.212 |
| 8th | 3.210 | 3.154 | 3.183 | 3.230 | 3.221 | 3.221 | 3.216 |
| % by mass Beta"-alumina Firing regime | | | | | | | |
| 5th | 87% | 90% | 87% | 86% | 90% | 91% | 92% |
| 6th | 80% | 90% | 88% | 84% | 86% | 92% | 92% |
| 7th | 80% | 90% | 87% | 83% | 85% | 91% | 90% |
| 8th | 79% | 91% | 90% | 83% | 87% | 91% | 90% |
| Tube Fracture Strength (MN/m$^2$) (Standard Deviation) Firing regime | | | | | | | |
| 5th | 133 | 235 | 163 | N/D | 151 | 174 | 195 |
|  | (13) | (27.4) | (4.8) |  | (23.7) | (54) | (26.0) |
| 6th | 147 | 185 | 172 | 167 | 206 | 191 | 210 |
|  | (35.6) | (34.2) | (30.8) | (19.4) | (36.5) | (36.8) | (17.4) |
| 7th | 164 | 230 | 211 | 211 | 209 | 210 | 239 |
|  | (22.7) | (27.6) | (16.0) | (14.3) | (49.4) | (10.6) | (34.1) |
| 8th | 157 | 163 | 205 | 202 | N/D | 227 | N/D |
|  | (24.7) | (82.7) | (23.0) | (30.2) |  | (33.9) |  |
| Open End Outer | | | | | | | |
| Tube Diameter (mm) | 33.06 | 32.83 | 31.94 | 31.04 | 30.15 | 31.66 | 31.81 |
| % by mass Lithia | 0.67 | 0.65 | 0.65 | 0.665 | 0.665 | 0.65 | 0.645 |
| % by mass Soda | 8.89 | 8.57 | 8.74 | 9.15 | 9.50 | 9.14 | 9.10 |

In each case whole or integral tubes could be obtained. From examination of polished sections of the tubes it was found that those of Batch 9 had relatively large crystals and that those tubes with relatively increased strengths had a lower proportion of crystals of the initial mixtures of alpha-alumina and boehmite are given in Table 8 and properties of the fired tubes are given in Table 9, after firing in magnesia crucibles according to the 8th firing regime given in Example 18, except that the tubes containing calcined boehmite were heated directly from 20° C. to 1,400° C. at 200° C./hr, and the firing regime of Batch 20 included a hold of 1 hr at 1,500° C.

TABLE 8

| Batch No Constituents | 16 | 17 | 18 | 19 | 20 | 21 | 22 | 23 |
|---|---|---|---|---|---|---|---|---|
| | | | | % by mass | | | | |
| calcined boehmite | 100 | 90 | 83 | 76 | 70 | 40 | 20 | 0 |
| alpha-alumina | 0 | 10 | 17 | 24 | 30 | 60 | 80 | 100 |

NOTE
In Batches 17, 21 and 22 uncalcined boehmite was in fact used, but in amounts calculated to give the amounts of calcined boehmite shown for Batches 17, 21 and 22 in Table 8, after loss of water during the initial heating.

It should also be noted that, in addition to the data given below in Table 9, the radial resistivity of tubes made as described above from Batch 16 varied with the maximum firing temperature and with the hold time at that temperature as follows:

| Maximum Firing Temperature | 1,610° C. | | 1,617° C. | |
|---|---|---|---|---|
| Hold time at maximum firing temperature | 60 minutes | 6 min | 20 min | 60 min |
| Resistivity at 250° C. (ohm cm) | 11.7 | 12.2 | 11.5 | 10.2 |
| Resistivity at 350° C. (ohm cm) | 5.8 | 6.1 | 5.7 | 5.1 |

TABLE 9

| Batch No | 16 | 17 | 18 | 19 | 20 | 21 | 22 | 23 |
|---|---|---|---|---|---|---|---|---|
| Firing Shrinkage (%) | 29.0 | N/D | N/D | 25.8 | 24.5 | 17.5 | 15.0 | 14.4 |
| Fired Density (g/cm$^3$) | 3.14 | 3.106 | N/D | 3.205 | 3.202 | 3.214 | 3.212 | 3.16 |
| Tube Fracture Strength (MN/m$^2$) (Standard Deviation) | 235 (27) | N/D | N/D | 197 (20) | 220 (12) | 227 (33) | 184 (31) | 173 (19) |
| Radial Resistivity (ohm cm at 350° C.) | 5.70 | N/D | N/D | 5.7 | 5.2 | 6.60 | 6.37 | 7.78 |
| Axial Resistivity (ohm cm at 350° C.) | 4.70 | 4.75 | N/D | 4.4 | 3.8 | 4.29 | 4.29 | N/D |
| Radial resistivity (ohm cm at 250° C.) | 11.5 | N/D | N/D | 10.8 | 10.1 | 13.2 | 14.3 | 17.42 |
| Soda Content (% by mass) | 9.6 | 8.64 | 9.0 | 9.18 | 9.01 | 8.96 | 9.41 | 8.92 |
| Lithia Content (% by mass) | 0.7 | 0.71 | 0.7 | 0.7 | 0.7 | 0.66 | 0.65 | 0.68 |
| Beta"-alumina content (% by mass) | 96–100 | 95 | N/D | N/D | 96 | 93 | 90 | 78 |

From Table 9, for at least some of the batches, eg Batches 20, 21 and 22, it appears that there is substantially more beta"-alumina in the fired tubes than would be expected from the boehmite in the starting mixture and from the alpha-alumina in the starting mixture. There thus appears to be substantial and unexpected synergism in the production of beta"-alumina.

EXAMPLE 20

Closed-ended tubes were fabricated from the starting mixtures of Batches 16–20 and 23 of Example 19 by isostatic pressing at 35,000 psi, with a length of 380 mm and an inside diameter of 63 mm.

It was found that the tubes of batches 16–18 always cracked at their closed ends, which were dome shaped, ie hemispherical, while those of batches 19, 20 and 23 did not. Surprisingly it was found that this cracking could be attributed to the more or less elastic or resilient expansion of the material of the isostatically pressed tubes, after the isostatic compressive force is relieved. It was also unexpectedly found that this expansion, which manifests itself as an increase in diameter and length of the tube when the isostatic compressive force is relieved, increases with increasing boehmite content and reducing alpha-alumina content, that of batch 16 being substantially greater than that of batch 23. The degree of expansion was measured by longitudinally sectioning smaller diameter green tubes in situ on the mandrels on which they were formed, and measuring the spacing between the convex surface of the mandrel dome and the concave surface of the tube dome. This spacing was, for batch 16, double that for Batch 23 with that for Batch 19 being less than that for Batch 16.

Accordingly, for the manufacture of large-dimension tubes, it appears to be desirable from the point of view of green tube cracking to have at least about 1 part by mass of alpha-alumina for every 3 parts by mass of boehmite in the starting mixture, batches 19–22 all appearing to be capable of providing an acceptably high beta"-alumina content of at least 90% by mass, with good green forming characteristics for making crack-free tubes open at one end by isostatic pressing on a mandrel having a hemispherical dome at one end.

EXAMPLE 21

Batches of various starting materials were prepared and spray dried as described for Example 16 and tubes open at one end were prepared by isostatic pressing generally as described for Example 16. The starting materials were respectively Alcoa A-16SG alpha-alumina, Cera Hydrate boehmite, calcined Cera Hydrate boehmite (calcined at 700° C. for 1 hr), and gibbsite as received from B. A. Chemicals. Soda (as NaOH) and lithia (as LiOH.H$_2$O) were added in the usual way and tubes were fired in the fashion described for Example 16, but according to a firing regime whereby they were heated from ambient (20° C.) to 1,200° C. at 100° C./hr and were held at 1,200° C. before being allowed to cool in the furnace to ambient. The samples were analysed for beta"-alumina content and results are set out in Table 11, which also gives soda and lithia contents of the fired tubes.

TABLE 11

| | Batch No | | | |
|---|---|---|---|---|
| | 24 alpha-alumina | 25 boehmite | 26 calcined boehmite | 27 gibbsite |
| soda (% by mass) | 8.9 | 9.0 | 9.1 | 9.2 |
| lithia (% by mass) | 0.6 | Nil | 0.65 | 0.64 |
| beta"-alumina (% by mass) | 41 | 90 | 92 | 56 |

This example contrasts the desirably high percentage of beta"-alumina obtained in the tubes from the Cera Hydrate boehmite, with that of the tubes from alpha-alumina and gibbsite. Importantly and unexpectedly, Batch 25 which contained no lithia, showed a proportion of beta"-alumina in the product tube which is almost as high as that of Batch 26, containing the usual amount of lithia.

EXAMPLE 22

Arising from Example 21, a series of batches of starting materials based on Batches 25 and 26 of Example 21 and using Cera Hydrate calcined to 700° C. for 1 hr, were prepared in the same fashion as Batch 26 of Example 21, with a constant soda content but with varying lithia contents. Tubes were pressed therefrom and fired at 200° C./hr from ambient temperature to 1,400° C.; then at 100° C./hr to 1,602° C.; followed by final heating at 60° C./hr up to a maximum temperature of 1,617° C. and there was a hold of 15 minutes at this temperature. The beta"-alumina in the product tubes is set out in Table 12, together with the proportion of residual beta-alumina, the lithia used, the soda used and the fired density.

TABLE 12

| Constituents | Batch No | | | | | | | | |
|---|---|---|---|---|---|---|---|---|---|
| | 28 | 29 | 30 | 31 | 32 | 33 | 34 | 35 | 36 |
| soda (% by mass) | 9.3 | 9.3 | 9.3 | 9.3 | 9.3 | 9.3 | 9.3 | 9.3 | 9.3 |
| lithia (% by mass) | 0.00 | 0.05 | 0.10 | 0.15 | 0.20 | 0.20 | 0.40 | 0.60 | 0.80 |
| beta"-alumina (% by mass) | 21 | 31 | 54 | 75 | 91 | 92 | 96 | 96 | 96 |
| beta-alumina (% by mass) | 78 | 68 | 45 | 24 | 8 | 7 | 3 | 3 | 3 |
| Fired Density (g/cm$^3$) | 3.084 | 3.097 | 2.96 | 3.05 | 2.91 | 2.93 | 3.05 | 3.10 | 3.197 |

(N/D = no determination done)

These results surprisingly show that low levels of lithia (which is expensive) can be used, as little as 0.2% by mass lithia giving a product with more than 90% by mass beta"-alumina, the relation between the proportion of beta"-alumina obtained and the lithia employed being roughly linear below 0.2% by mass lithia.

With regard to this Example it should be noted that calcining of the precursor of aluminium oxide can, if desired, be carried out in a nitrogen atmosphere such as would typically be employed as a protective atmosphere in a belt furnace. In fact the boehmite of the present Example was calcined by passing it through a belt furnace at 700° C. under a nitrogen protective atmosphere.

EXAMPLE 23

Spray dried powders were prepared according to the procedure of Example 16 comprising respectively RC-HPS-DBM Reynolds Aluminium alpha-alumina (Batch 37) with 8.9% by mass soda (as NaOH) and 0.65% by mass lithia (as LiOH.H$_2$O) and Cera Hydrate boehmite (Batch 38) as received (uncalcined) with 9.3% by mass soda (as NaOH) and 0.72% by mass lithia (as LiOH.H$_2$O). Discs having a diameter of 12 mm and a thickness of 5–6 mm were die pressed from these starting materials at a load of 15 metric tonnes and heated to 700° C. at 200° C./hr and held at this temperature for 1 hr to remove volatiles before being allowed to cool in the furnace to ambient temperature (20° C.). These discs were then wrapped in platinum foil, thermocouples were attached thereto and they were slowly inserted into a furnace at a nominal temperature of 1,615° C. After 10 minutes the temperatures of the discs was found to have increased to a maximum of 1,613° C. They were held at 1,613° C. for a further 15 minutes, after which they were cooled rapidly by removal from the furnace. The fired discs were analysed for lithia content and soda content, and by X-ray diffraction for beta"-alumina content, beta-alumina content and alpha-alumina content. Results are set out in Table 13.

TABLE 13

| | Batch No | |
|---|---|---|
| Constituents | 37 (boehmite) | 38 (alpha-alumina) |
| soda (% by mass) | 9.3 | 8.9 |
| lithia (% by mass) | 0.72 | 0.65 |
| beta"-alumina (% by mass) | 88 | 55 |
| beta-alumina (% by mass) | 0 | 30 |
| alpha-alumina (% by mass) | 12 | 15 |

The surprising aspect of this example is the unexpected ability of the boehmite to form beta"-alumina on firing with no production of beta-alumina. The alpha alumina present arises directly from the fast rate of firing.

It will be noted that in this Example the firing was at an average heating rate of about 160° C./min, ie from ambient to 1,615° C. (about 1,600° C.) in 10 minutes.

EXAMPLE 24

In this Example comparative tests were conducted employing a trihydrate of aluminium oxide, namely a gibbsite, obtained from B A Chemicals Plc, as the precursors of aluminium oxide, and also precursors comprising this gibbsite in which a proportion (28.5% by mass) was replaced by the same mass of calcined Cera Hydrate boehmite, calcined by heating the boehmite to 1,060° C. and keeping it at this temperature for 1 hr. Starting mixtures were prepared by adding NaOH and LiOH.H$_2$O to the precursors and, as described for Example 16, they were vibro-milled, spray-dried and isostatically pressed into tubes. The tubes were then fired according to the 8th firing regime given in Example 18 except that the heating at 100° C./hr was from 1,400°–1,607° C. and they were fired to a maximum temperature of 1,617° C., the final heating from 1,607°–1,617° C. being at 60° C./hr, the maximum temperature of 1,617° C. being held for 15 minutes.

The moisture contents of the powders after spray-drying were measured and, after firing, the soda and lithia contents of the tubes were determined, as were their fired dentisities and outer diameters, and their beta"-alumina contents were determined by X-ray diffraction. These results are set out in the following table, Table 14, for the batches in question, namely Batches 39 and 40 which were B A Chemicals gibbsite by itself, and Batch 41, which was, as mentioned above, B A Chemicals gibbsite with 28.5% by mass thereof replaced by the same mass of Cera Hydrate boehmite calcined by heating to 1,060° C. and held at 1,060° C. for 1 hr.

TABLE 14

|  | Batch No | | |
| --- | --- | --- | --- |
|  | 39 | 40 | 41 |
| Milling Time (hrs) | 5 | 6 | 5 |
| Moisture Content of Spray-dried Powder (% by mass) | 1.0 | 2.2 | 1.2 |
| Soda Content of Fired Tubes (% by mass) | 9.22 | 9.12 | 8.66 |
| Lithia Content of Fired Tubes (% by mass) | 0.635 | 0.624 | 0.614 |
| Outside Diameters of Fired Tubes (mm) | 28.30 | 28.63 | 28.20 |
| Fired Density of Tubes (g/cm$^3$) | 3.147 | 2.956 | 3.169 |
| Beta''-alumina Content of Fired Tubes (% by mass) | 86 | 87 | 91 |

This Example illustrates that the gibbsite, which is the Baco gibbsite referred to in Table 16 hereunder and which does not have A/S and B/S values which comply with Equations (I) and (II) herein, can be upgraded as a starting material by having Cera Hydrate boehmite (whose A/S and B/S values do comply with Equations (I) and (II)) added thereto, to obtain a higher proportion of beta''-alumina in the fired product tubes. Batch 41 was thus in accordance with the invention and Batches 39 and 40 were controls.

EXAMPLE 25

In this Example a colloidal boehmite, namely Bacosol 2 obtained from B A Chemicals Plc, which did not have A/S and B/S values complying with Equations (I) and (II) herein, was tested as a control. The Bacosol 2 was calcined to 700° C. and cooled before being vibromilled to form a slip containing 34% by mass water. Sodium carbonate was added as a soda precursor and LiOH.H$_2$O was added as a lithia precursor, followed by spray drying and isostatic tube pressing as described above for Example 16, and firing according to the firing regime set out in Example 24. Two tubes designated Batches 42 and 43 respectively were prepared, and their firing shrinkage, fired density, fracture strength, radial and axial resistivities and soda contents were determined. Results are set out in Table 15, together with their lithia contents, which were measured before firing.

TABLE 15

| Batch No. | 42 | 43 |
| --- | --- | --- |
| Firing Shrinkage (%) | 25.3 | 25.1 |
| Fired Density (g/cm$^3$) | 3.14 | 3.14 |
| Tube Fracture Strength (MN/m$^2$) | Weak | N/D |
| Radial Resistivity at 250° C. (ohm cm) | 20.9 | 27.5 |
| Radial Resistivity at 350° C. (ohm cm) | 9.9 | 12.3 |
| Axial Resistivity at 350° C. (ohm cm) | N/D | 6.13 |
| Soda Content (% by mass) | 9.30 | 9.34 |
| Lithia Content (% by mass) | 0.7 | 0.7 |

(N/D - No determination carried out; and
"Weak" - the growth of large crystals in the tubes weakened the tube material to such an extent that cut samples for use in strength determinations broke before they could be tested).

Beta''-alumina content was determined by X-ray diffraction to be approximately 88% by mass with broad peaks characteristic of mixtures of beta-alumina and beta''-alumina.

EXAMPLE 26

A batch (Batch No. 44) of Kaiser bayerite starting material was prepared by calcining it in a belt furnace for a period of ½ hr at a temperature of 700° C. A slip was prepared from the calcined material containing 33% by mass solids and soda and lithia precursors were respectively added to give calculated eventual soda and lithia contents of 9.4% by mass and 0.74% in the product tubes. The slip was spray dried as described for Example 16 above, to obtain a spray dried powder having a moisture content of 4.4% by mass. Tubes were isostatically pressed therefrom as described for Example 16 and were fired according to the firing regime of Example 22 but to a maximum temperature of 1620° C., ie at 200° C./hr from ambient up to 1,400° C., then at 100° C./hr to 1,605° C.; followed by final heating at 60° C./hr to 1,620° C. with a hold at 1,620° C. for 15 minutes.

A further batch (Batch No. 45) was prepared in the same fashion from as-received Kaiser bayerite and fired in the same way, the slip in this case containing 38.4% by mass solids and being spray dried to 3.1% moisture. Tubes produced had the properties set out in Table 16, fracture strength being measured by the Bortz ring test. Certain tubes in each batch were fired only up to 1200° C. and were cooled after a 6 minute hold at 1,200° C., their beta''-alumina contents being included for comparison.

TABLE 16

| Batch No. | 44 | 45 |
| --- | --- | --- |
| Firing Shrinkage (%) | 35.5 | N/D |
| Fired Density (g/cm$^3$) | 3.196 | 3.086 |
| Tube Fracture Strength (NM/m$^2$) (Standard Deviation) | 231 (9.2) | 255 (24.2) |
| Axial Resistivity at 350° C. (ohm cm) | 6.0 | 4.74 |
| Radial Resistivity at 350° C. (ohm cm) | 8.9 | N/D |
| Radial Resistivity at 250° C. (ohm cm) | 2.1 | N/D |
| Beta''-alumina content (% by mass) | 94 | 94 |
| Beta''-alumina content fired to 1,200° C. (% by mass) | 83 | 83 |

It should be noted that in Examples 1–11 and 16–26 the samples were cooled after firing according to a cooling regime whereby they were cooled from the maximum temperature to 1,500° C. at 900° C./hr, from 1,500° C. to 1,200° C. at 100° C./hr and from 1,200° C. to ambient at the natural cooling rate in the furnace.

As regards the various precursors of aluminium oxide tested in the Examples, and others, values of A/S and B/S were obtained by X-ray diffraction as described herein. Values of A and B were obtained in each case using 7 samples and a value for S was obtained using 10 samples. The value obtained for S was 1,232 with a standard deviation of 3.0%. Values for A/S and B/S for the various materials tested are set out in Table 17.

TABLE 17

| Precursor | A/S (Standard Deviation %) | B/S (Standard Deviation %) |
| --- | --- | --- |
| Cera Hydrate boehmite | 0.0951 (4.2) | 0.0804 (6.1) |
| Catapal pseudoboehmite | 0.0189 (7.4) | 0.0264 (5.5) |
| Kaiser bayerite | 0.0535 (4.4) | 0.0589 (4.4) |
| Baco bayerite | 0.0172 (10.8) | 0.0335 (7.6) |
| OL 107 gibbsite | 0.0148 (10.7) | 0.0309 (6.4) |
| Baco gibbsite | 0.0211 (8.9) | 0.0342 (3.2) |

The Cera-hydrate, Kaiser bayerite and Catapal pseudoboehmite are those mentioned hereinabove, and the Baco bayerite and Baco gibbsite are those mentioned above respectively obtained from B A Chemicals Plc. The OL 107 gibbsite in turn was obtained from Martinswerk GmbH, Bergheim, West Germany.

All the above materials are either monohydrates of aluminium oxide or trihydrates of aluminium oxide, but only certain of them, whose A/S and B/S values comply with equations (I) and (II) herein, namely Cera Hydrate and Kaiser bayerite, are regarded as useful for the present invention, as demonstrated by the Examples. The gibbsites, the Baco bayerite and the Catapal pseudoboehmite, the latter in particular, was surprisingly entirely unsuitable for the purpose of the present invention, providing products having unacceptably low levels of beta"-alumina therein. As suggested above, but without being bound by theory, the Applicant believes that the disorder in the crystal structure of the undesirable calcination products is carried through to the final beta"-alumina reaction product, leading to undesirable products for ionic conduction. It is unclear to the Applicant exactly what features of the crystal structure distinguish the desirable starting materials in accordance with the invention from those which are not useful, but the aforesaid A/S and B/S ratios provide a clear measure whereby they can be distinguished. As is born out by the A/S and B/S ratios, Cera Hydrate boehmite is in fact a more desirable material than Kaiser bayerite, although Kaiser bayerite has been found to be substantially better for the purpose of the present invention than any other possible starting material, other than Cera Hydrate. The Applicant believes, however, that any suitable precursor of aluminum oxide which has sufficiently high A/S and B/S ratios, will be a useful starting material for the method of the present invention.

BRIEF DESCRIPTION OF DRAWING

Figure 4:
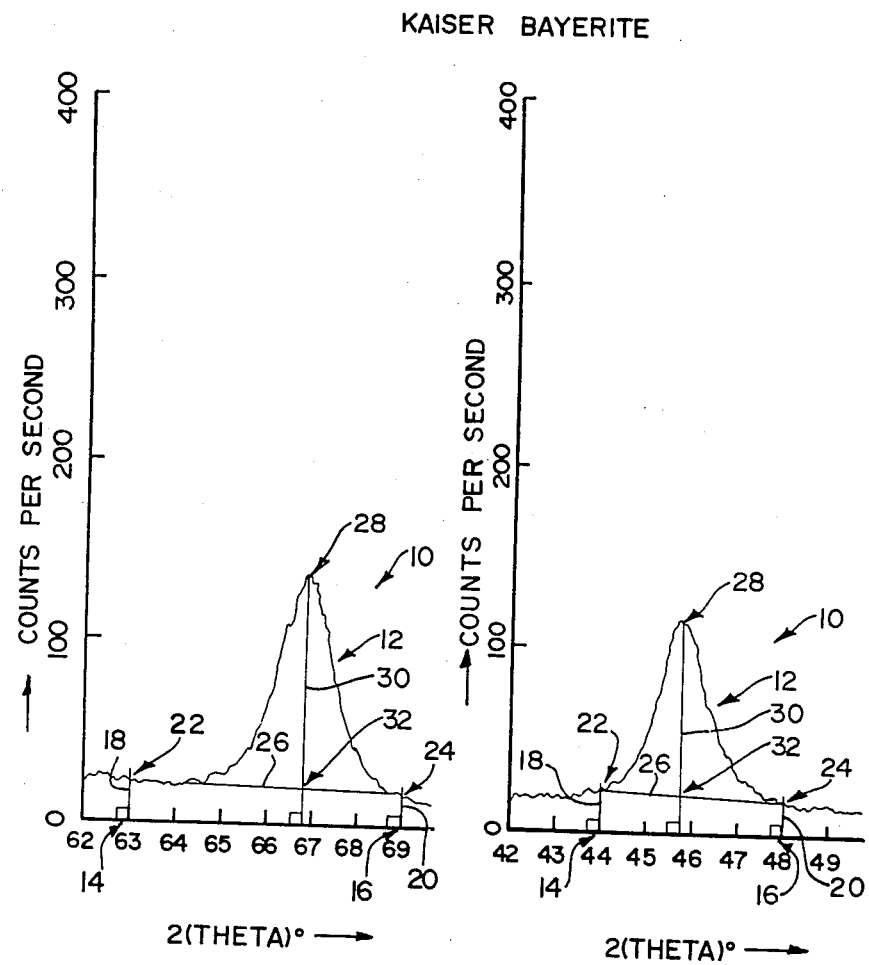
Figure 5:
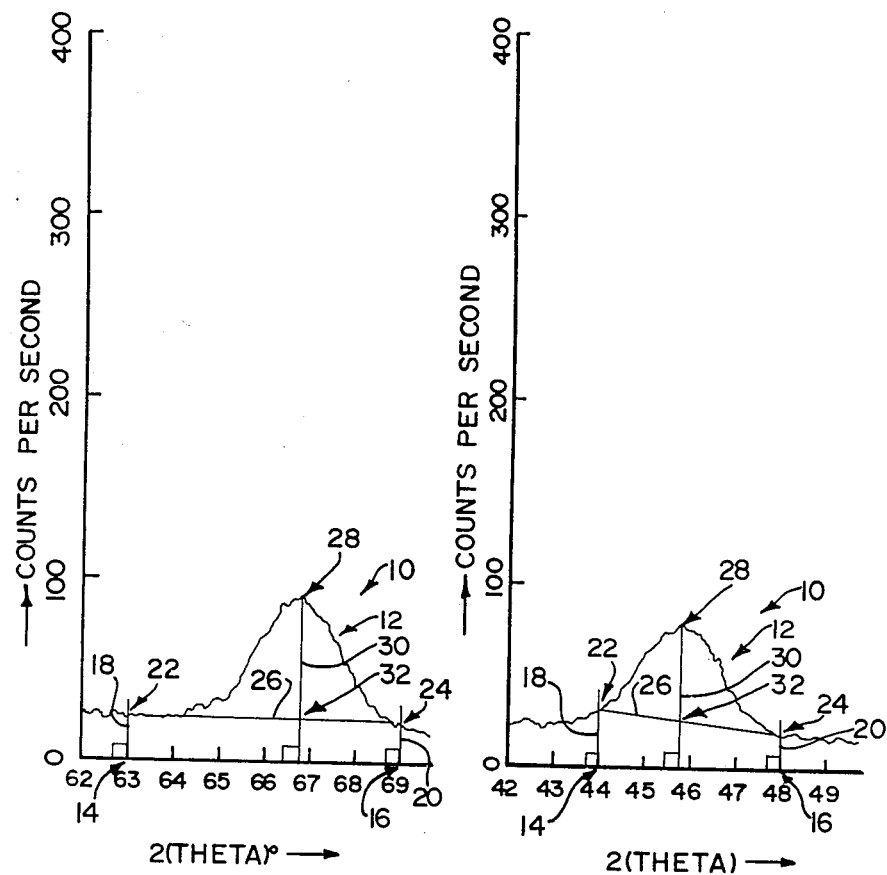
Figure 6:
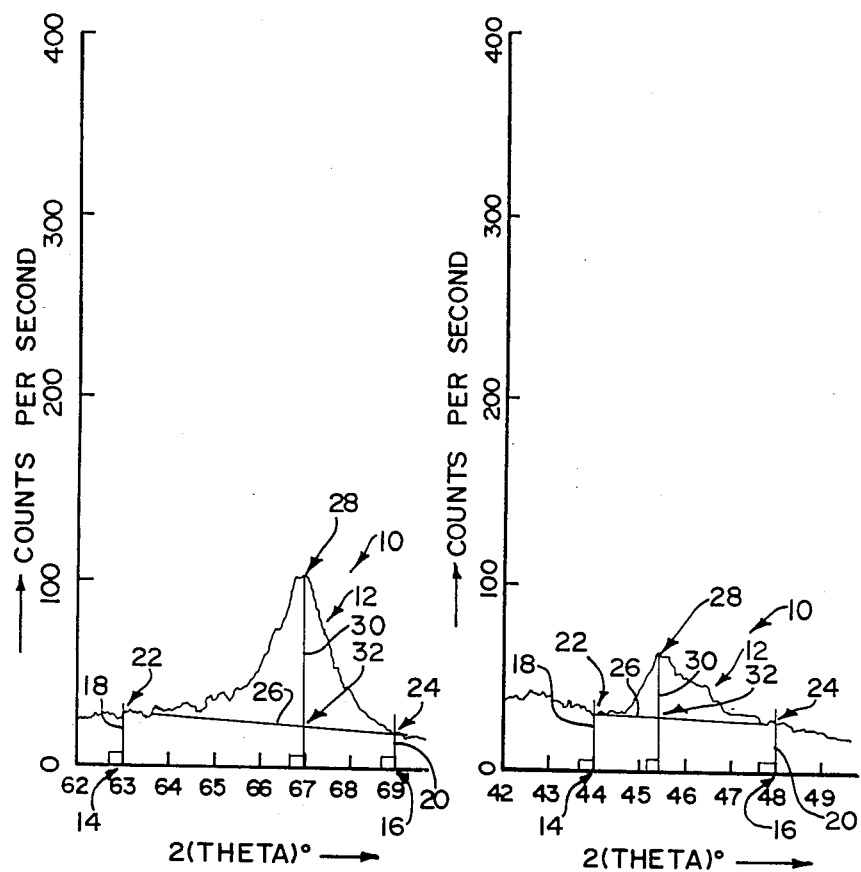

By way of example X-ray diffraction traces of the type in question as explained and described above with reference to FIG. 1, are shown in FIGS. 3–6, which respectively show, in the 2(theta) ranges 42°–49° and 62°–70°, the X-ray diffraction traces for Cera Hydrate boehmite (FIG. 3), Kaiser bayerite (FIG. 4); Catapal pseudoboehmite (FIG. 5); and Baco gibbsite (FIG. 6). In these Figures plots are shown of intensity in counts per second against 2(theta). The same reference numerals are used for the same parts of the traces as in FIG. 1. From these Figures can be obtained the maximum intensities of the peaks in question (length of line 30 between points 28 and 32) and integrated intensities i.e. areas enclosed by points 22-28-24-32-22. They are as set out in Table 18:

TABLE 18

| Figure No | 2(theta)° | Precursor | Maximum Intensity (counts per second) | Integrated Intensity (counts per second × 2(theta)°) |
|---|---|---|---|---|
| 3 | 44–48 | Cera Hydrate | 130.8120 | 148.3036 |
|   | 63–69 | boehmite | 140.6916 | 213.8895 |
| 4 | 44–48 | Kaiser | 92.2261 | 134.1889 |
|   | 63–69 | bayerite | 115.1536 | 179.3777 |
| 5 | 44–48 | Catapal | 46.8503 | 98.3751 |
|   | 63–69 | pseudoboehmite | 69.1679 | 145.0423 |
| 6 | 44–48 | Baco gibbsite | 34.4405 | 47.6534 |
|   | 63–69 |  | 77.4547 | 141.2798 |

It is from results of this type that the values shown in Table 17 were calculated.

In Tables 17 and 18 results are shown obtained from starting materials (precursors of aluminium oxide) calcined to 700° C. Certain of the materials have been tested in a similar fashion after calcining to 500° C. instead of 700° C., other aspects of the X-ray diffraction being unchanged. Values for A/S and B/S were obtained as set out in Table 19 hereunder.

TABLE 19

| Precursor | A/S (Standard Deviation %) | B/S (Standard Deviation %) |
|---|---|---|
| Cera Hydrate | 0.0769 (2.7) | 0.0844 (4.7) |
| Kaiser bayerite | 0.0519 (6.3) | 0.0492 (3.7) |
| Baco bayerite | 0.0257 (4.7) | 0.0113 (6.5) |
| Baco gibbsite | 0.0343 (4.1) | 0.0244 (7.3) |

These results show that the trend in values for A/S and B/S shown in Table 17, with Cera Hydrate having the best values and Baco bayerite having the worst values, is maintained when sample preparation involves calcining to 500° C. instead of 700° C.

Furthermore, in accordance with the present invention, it has been found that mixing desirable starting materials such as Cera Hydrate with less desired starting materials, including alpha-alumina, can lead to products with acceptably high beta"-alumina contents, and with apparent synergism as regards the production of beta"-alumina. Furthermore, diluting the desired substances such as Cera Hydrate with alpha-alumina or the like, can in certain situations lead to advantages in the green fabrication of artifacts such as electrochemical cell separator tubes.

An important advantage of the invention is that it provides, unexpectedly, a straightforward method for obtaining substantially a 100% pure beta"-alumina in certain cases, which has substantial utility in the construction of separators for electrochemical cells. Undesirable starting materials, in contrast, when they produce some beta"-alumina when treated in a similar fashion produce it as a mixture with beta-alumina. Such mixed products are less suitable, when compared with the substantially 100% beta"-alumina which the present invention can obtain, for further use and processing to produce electrochemical separators, because of the problems associated with the electrical conductivity of such mixed products.

Thermogravimetric and differential thermal analysis performed on the starting materials of eg Example 4 as it was heated, indicated that at least Cera Hydrate passes through a series of irreversible transition alumina phases between 500° and 1,200° C., resulting in alpha-alumina. Lithia and/or soda are added to the calcined Cera Hydrate. During subsequent heating the lithia and/or soda are incorporated into the structure such that, further heating leads to the formation of the beta"-alumina.

A further advantage of the invention is that, in principle, products can be produced with acceptably high proportions of beta"-alumina therein, by following relatively simple and straightforward heating regimes, with a single peak or maximum temperature, and straightforward preparation procedures. Furthermore, these procedures can be used to make unitary artifacts, such as tubes for electrochemical cell separators. The preferred starting materials Cera Hydrate and Kaiser bayerite are readily available starting materials and are relatively inexpensive. Furthermore the relatively low levels of lithia which need to be added serve to accentuate the benefit to be derived from Cera Hydrate, bearing in mind that lithia is an expensive starting material. Nevertheless, if necessary, the proportion of lithia can be increased, eg to 0.80% by mass or more, when extremely high levels of beta"-alumina, approaching 100%, in the product, are desired.

By producing over 90% by mass beta"-alumina at temperatures as low as 1,200° C., the use of Cera Hydrate readily ensures that when the artifact is finally sintered, it is essentially beta"-alumina which is being sintered. This is without recourse to operations such as pre-calcination and milling of the product composition as in the so-called Zeta process. Complete formation of beta"-alumina at temperatures as low as 1,200° C. is of particular interest when artifacts are to be formed by electrophoretic deposition of a powder formed by milling a calcined mixture.

It should also be noted that acceptability of a starting material (precursor of aluminium oxide) can be adversely influenced by factors such as its chemical purity, eg its $SiO_2$ content, which can influence its electrical conductivity. Thus, for example Kaiser bayerite has, according to the manufacturer, 0,2% m/m $SiO_2$, and it may be possible that, with a lower $SiO_2$ content, its conductivity may be improved.

What is claimed is:

1. A method of making beta"-alumina which comprises dispersing in a precursor for aluminium oxide a member of the group comprising sodium oxide and its precursors, and dispersing in the precursor of aluminium oxide a spinel stabilizer which is a member of the group comprising spinel-forming oxides and the precursors thereof, to form a mixture, and then heating the mixture to a temperature at which the precursor of aluminium oxide is converted to beta"-alumina, the precursor of aluminium oxide being one which, when calcined in air by itself, has a calcination product which, when subjected to X-ray diffraction is defined herein, displays an X-ray diffraction trace whose peak with the highest intensity in the 2(theta) range of 44°–48° and whose peak with the highest intensity in the 2(theta) range of 63°–69° respectively have maximum intensities and integrated intensities which comply with equations (I) and (II):

A/S is greater than 0.03    (I);

and

B/S is greater than 0.04    (II), in which:

$$A = \frac{(\text{maximum intensity})^2}{(\text{integrated intensity})}$$

in counts per second/2(theta)° for the calcination product in the 2(theta) range 44°–48°;

$$B = \frac{(\text{maximum intensity})^2}{(\text{integrated intensity})}$$

in counts per second/2(theta)° for the calcination product in the 2(theta) range 63°–69°;

$$S = \frac{(\text{maximum intensity})^2}{(\text{integrated intensity})}$$

in counts per second/2(theta)° for the 211 peak in a rutile ($TiO_2$) standard occuring in the 2(theta) range 52°–56°;

maximum intensity=the maximum intensity in counts per second above background displayed by the peak with the highest intensity in the 2(theta) range in question; and integrated intensity=the area under the peak, above background, in the 2(theta) range in question, in units of 2(theta)°×counts per second.

A, B and S being mean values for at least five samples having a standard deviation of less than 10% and the rutile standard being the intensity standard rutile of the National Bureau of Standards of the United States Department of Commerce accorded standard material No. 674 and having a d-spacing of 1.6874 Angstrom units for the 211 peak in question.

2. A method as claimed in claim 1, in which the precursor of aluminium oxide is such that said calcination product displays an X-ray diffraction trace whose peaks with the highest intensity in the 2(theta) ranges respectively of 44°–48° and 63°–69° have maximum intensities and integrated intensities which comply respectively with equations (III) andd (IV):

A/S is greater than 0.05    (III);

and

B/S is greater than 0.05    (IV), wherein A, B and S are as defined in claim 1.

3. A method as claimed in claim 2, in which the precursor of aluminium oxide is such that said calcination product displays an X-ray diffraction trace whose peaks with highest intensities in the 2(theta) ranges respectively of 44°–48° and 63°–69° have maximum intensities and integrated intensities which comply respectively with equations (V) and (VI):

A/S is greater than 0.09    (V);

and

B/S is greater than 0.07    (VI), wherein A, B and S are as defined in claim 1.

4. A method as claimed in claim 1, in which the precursor of aluminium oxide is hydrated and is a member of the group comprising monohydrates of alumina in accordance with the formula $Al_2O_3 \cdot mH_2O$ in which m is from 1.3 and trihydrates of alumina in accordance with the formula $Al_2O_3 \cdot nH_2$ in which n is from 3 to 3.5.

5. A method as claimed in claim 4, in which the precursor of aluminium oxide is a monohydrate of alumina which is a boehmite, the boehmite having an average crystallite size as determined by X-ray line broadening and scanning electron microscopy of at least 100 Angstrom units, an average basal plane spacing as determined by X-ray diffraction of at most 6.8 Angstrom units, a mass loss on heating at 10° C./min from ambient temperature in air to 700° C. of at most 20% by mass, and, when heated at 10° C./min from ambient temperature in air up to 700° C., a maximum rate of mass loss occurring at a temperature of at least 400° C.

6. A method as claimed in claim 5, in which said average cystallite size is at least 1000 Angstrom units, said basal plane spacing is at most 6.5 Angstrom units, and said mass loss on heating is at most 17%, and said maximum rate of mass loss occurs at a temperature of at least 500° C.

7. A method as claimed in claim 5 or claim 6, in which the boehmite is hydrothermally prepared.

8. A method as claimed in claim 4, in which the precursor of aluminium oxide is a trihydrate of alumina and is a bayerite, the bayerite having an average crystallite size as determined by X-ray line broadening and scanning electron microscopy of at least 100 Angstrom units, an average basal plane spacing as determined by X-ray diffraction of at most 4.9 Angstrom units, a mass loss on heating at 10° C./min from ambient temperature in air to 700° C. of at most 40% by mass, and, when heated at 10° C./min from ambient temperature in air up to 700° C., a maximum rate of mass loss occurring at a temperature of at least 240° C.

9. A method as claimed in claim 8, in which said average crystallite size is at least 500 Angstrom units, said basal plane spacing is at most 4.75 Angstrom units, said mass loss on heating is at most 37%, and said maximum rate of mass loss occurs at a temperature of at least 260° C.

10. A method as claimed in claim 1, in which the mixture which is heated is formulated to contain, after heating, from 7-10% by mass soda.

11. A method as claimed in claim 1, in which the spinel stabilizer is a member of the group comprising lithia, magnesia, and the precursors thereof.

12. A method as claimed in claim 11, in which the mixture which is heated is formulated to contain, after heating, lithia as its spinel stabilizer, in a proportion of 0.05-1.0% by mass.

13. A method as claimed in claim 11, in which the mixture which is heated is formulated to contain, after heating, magnesia as its spinel stabilizer, in a proportion of 0.25-5% by mass.

14. A method as claimed in claim 1, in which the soda and spinel stabilizer are dispersed in the precursor of aluminium oxide by milling.

15. A method as claimed in claim 14, in which the milling is wet milling until 80% by mass of the milled material is less than 55,000 Angstrom units in size, the milled material being spray-dried prior to heating.

16. A method as claimed in claim 1, in which the precursor aluminium oxide is calcined by heating to a temperature of 250°-1,100° C., prior to mixing with the soda and spinel stabilizer.

17. A method as claimed in claim 1, in which the heating of the mixture is according to a heating regime whereby the temperature of the mixture is progressively increased to a maximum temperature, and is thereafter cooled according to a cooling regime whereby the temperature of the heated product is progressively cooled to ambient temperature.

18. A method as claimed in claim 17, in which the maximum temperature is held for a predetermined period, after which said cooling takes place.

19. A method as claimed in claim 1, in which the heating of the mixture is to a maximum temperature of at least 1,100° C.

20. A method as claimed in claim 19, in which the heating of the mixture is to a maximum temperature sufficient to form a unitary self-supporting mass from the mixture.

21. A method as claimed in claim 20, in which said mixture is formed in a green state into an artifact, prior to the heating of the mixture.

22. A method as claimed in claim 21, in which the mixture in dry powder form and containing less than 10% by mass moisture is formed into the artifact by pressing to a pressure of 5,000-100,000 psi.

23. A method as claimed in claim 22, in which the pressing is isostatic pressing and is to a pressure of 30,000-60,000 psi.

24. A method as claimed in claim 20, in which the heating of the mixture is to a maximum temperature of 1,550°-1,700° C.

25. A method as claimed in claim 20, in which the rate of heating the mixture is between 150° and 250° C./h from a temperature of at least 550° C. up to a temperature not closer than 100° C. to said maximum temperature, and then at a rate of at most 100° C./h until the maximum temperature has been reached.

26. A method as claimed in claim 25, in which the rate of heating of the mixture from ambient temperature up to said temperature of at least 550° C. is at most 100° C./h.

27. A method as claimed in claim 20, in which the precursor of aluminium oxide is calcined by heating to a temperature of 250°-1,100° C., prior to mixing with the soda and spinel stabilizer, and in which the average rate of heating of the mixture is above 50° C./min.

28. A method as claimed in claim 20, in which the average rate of heating is in the range of 100° C./min-200° C./min.

29. A method as claimed in claim 20, in which the mixture which is heated comprises alpha-alumina.

30. A method as claimed in claim 29, in which the alpha-alumina is present in a proportion of at most 95% by mass of the mass of precursor of aluminium oxide in the mixture which is heated.

31. A method as claimed in claim 29, in which the alpha-alumina is present in a proportion of at least 5% by mass of the mass of the precursor of aluminium oxide in the mixture which is heated.

32. A method as claimed in claim 30, in which the alpha-alumina is present in a proportion of at least 5% by mass of the mass of the precursor of aluminium oxide in the mixture which is heated.

33. A method as claimed in claim 20, in which the mixture which is heated comprises gibbsite.

34. A method as claimed in claim 33, in which the gibbsite is present in a proportion of at least 5% by mass and at most 95% by mass of the mass of precursor of aluminium oxide in the mixture which is heated.

* * * * *

UNITED STATES PATENT AND TRADEMARK OFFICE
CERTIFICATE OF CORRECTION

PATENT NO. : 4,732,741

DATED : March 22, 1988

INVENTOR(S) : Duncan et al.

It is certified that error appears in the above-identified patent and that said Letters Patent is hereby corrected as shown below:

Column 34, line 21, delete the word "andd" between the numeral "(III)" and the numeral "(IV)" and insert the word --and--.

Column 34, line 49, insert the phrase --1 to-- between the word "from" and the numeral "1.3"..

Column 34, line 66, delete the word "and" between the word "units" and the word "said".

Signed and Sealed this

Second Day of August, 1988

Attest:

DONALD J. QUIGG

Attesting Officer

Commissioner of Patents and Trademarks